(12) United States Patent
Foo et al.

(10) Patent No.: US 10,589,859 B2
(45) Date of Patent: Mar. 17, 2020

(54) APPARATUS AND METHOD FOR AERIAL RECOVERY OF AN UNMANNED AERIAL VEHICLE

(71) Applicant: Singapore Technologies Aerospace Ltd, Singapore (SG)

(72) Inventors: Chi Hui Frederic Foo, Singapore (SG); Han Lin Hsi, Singapore (SG)

(73) Assignees: ST ENGINEERING AEROSPACE LTD., Singapore (SG); SINGAPORE TECHNOLOGIES AEROSPACE LTD, Singapore (SG)

(*) Notice: Subject to any disclaimer, the term of this patent is extended or adjusted under 35 U.S.C. 154(b) by 466 days.

(21) Appl. No.: 15/400,796

(22) Filed: Jan. 6, 2017

(65) Prior Publication Data
US 2017/0197725 A1     Jul. 13, 2017

(30) Foreign Application Priority Data
Jan. 8, 2016   (SG) .......................... 10201600154W

(51) Int. Cl.
    *B64C 39/02*     (2006.01)
    *B64C 39/10*     (2006.01)

(52) U.S. Cl.
    CPC ...... *B64C 39/024* (2013.01); *B64C 2039/105* (2013.01); *B64C 2201/063* (2013.01);
(Continued)

(58) Field of Classification Search
CPC ........ B64C 2201/027; B64C 2201/082; B64C 2201/206; B64C 2201/182; B64C 2201/063; B64C 39/024; B64D 5/00
See application file for complete search history.

(56) References Cited

U.S. PATENT DOCUMENTS 2,471,599 A * 5/1949 Young ..................... B64D 5/00
                                                       244/2
2,969,803 A * 1/1961 Mosher .................. B64D 37/22
                                                     137/263

(Continued)

FOREIGN PATENT DOCUMENTS

| EP | 0786403 | 7/1997 |
|----|---------|--------|
| EP | 2727835 | 5/2014 |
| UA | 99079 | 7/2012 |

OTHER PUBLICATIONS

Search Report and Written Opinion dated Apr. 20, 2016, issued in priority Singapore Application No. 10201600154W.

(Continued)

*Primary Examiner* — Benjamin P Lee
(74) *Attorney, Agent, or Firm* — Norton Rose Fulbright US LLP

(57) ABSTRACT

An apparatus and method for aerial recovery of an unmanned aerial vehicle (UAV) are provided. The apparatus includes a rigid base having a first section and a second section, wherein the first section is securely mounted to a floor of an aircraft. The apparatus further includes a servicing platform moveably mounted to the base and configured to move along a direction parallel to a longitudinal axis of the aircraft such that in an extended position, the servicing platform at least partially protrudes from a rear cargo door of the aircraft, wherein the servicing platform comprises a capturing mechanism configured to capture the UAV in the extended position.

18 Claims, 22 Drawing Sheets

(52) U.S. Cl.
CPC .. *B64C 2201/082* (2013.01); *B64C 2201/104* (2013.01); *B64C 2201/121* (2013.01); *B64C 2201/141* (2013.01); *B64C 2201/182* (2013.01); *B64C 2201/185* (2013.01); *Y02T 50/12* (2013.01)

(56) References Cited

U.S. PATENT DOCUMENTS

| | | | |
|---|---|---|---|
| 3,520,502 | A | 7/1970 | Smethers, Jr. |
| 4,890,751 | A * | 1/1990 | Opdahl ................ B64D 3/02 212/271 |
| 6,869,042 | B2 * | 3/2005 | Harrison ............. B64C 39/024 244/110 R |
| 6,932,299 | B2 | 8/2005 | Beyerle et al. |
| 7,793,888 | B2 | 9/2010 | Padan |
| 8,950,698 | B1 * | 2/2015 | Rossi ................. B64C 37/02 244/2 |
| 9,421,869 | B1 * | 8/2016 | Ananthanarayanan ................ B60L 5/005 |
| 9,896,208 | B2 * | 2/2018 | Retig ................ B64D 5/00 |
| 10,179,648 | B2 * | 1/2019 | Chin ................. B64D 5/00 |
| 2002/0074454 | A1 | 6/2002 | Henderson |
| 2004/0065779 | A1 * | 4/2004 | Karpov ............... B64D 1/10 244/137.3 |
| 2006/0249622 | A1 * | 11/2006 | Steele ............... B64F 1/02 244/115 |
| 2010/0038477 | A1 * | 2/2010 | Kutzmann ......... B64C 39/024 244/1 TD |
| 2016/0355261 | A1 * | 12/2016 | Chin ................. B64D 5/00 |
| 2017/0349283 | A1 * | 12/2017 | Paunicka .......... B64D 5/00 |

OTHER PUBLICATIONS

Examination Report dated Dec. 30, 2016, issued in priority Singapore Application No. 10201600154W.

* cited by examiner

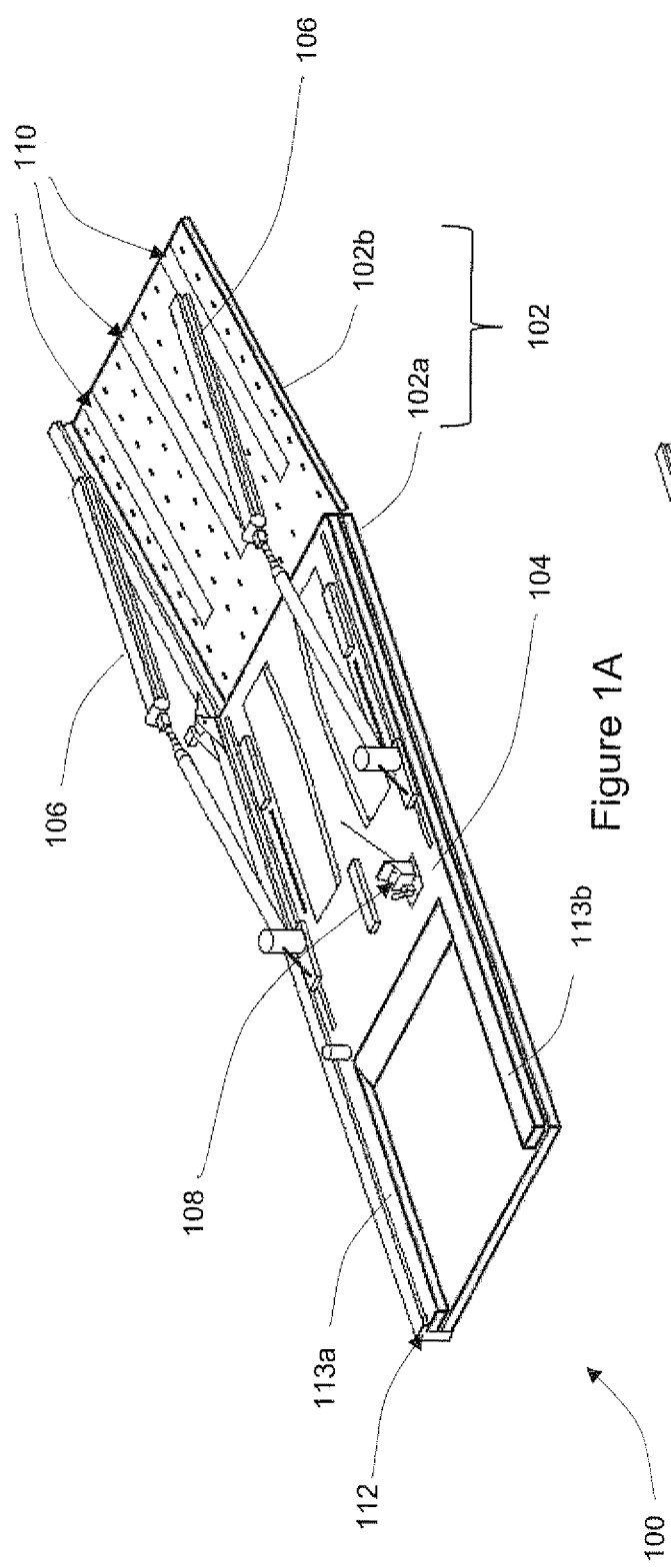
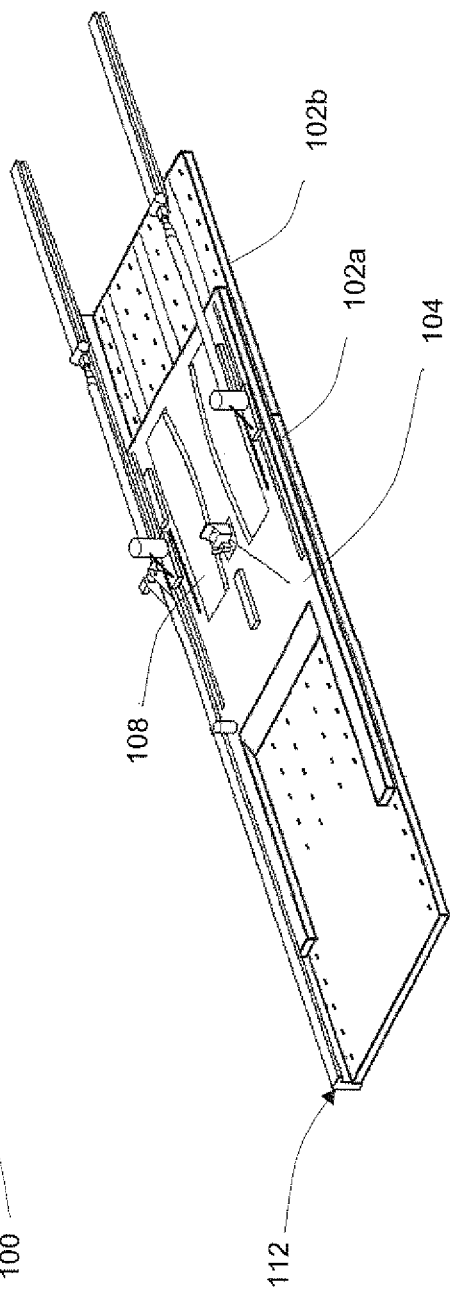
Figure 1A
Figure 1B

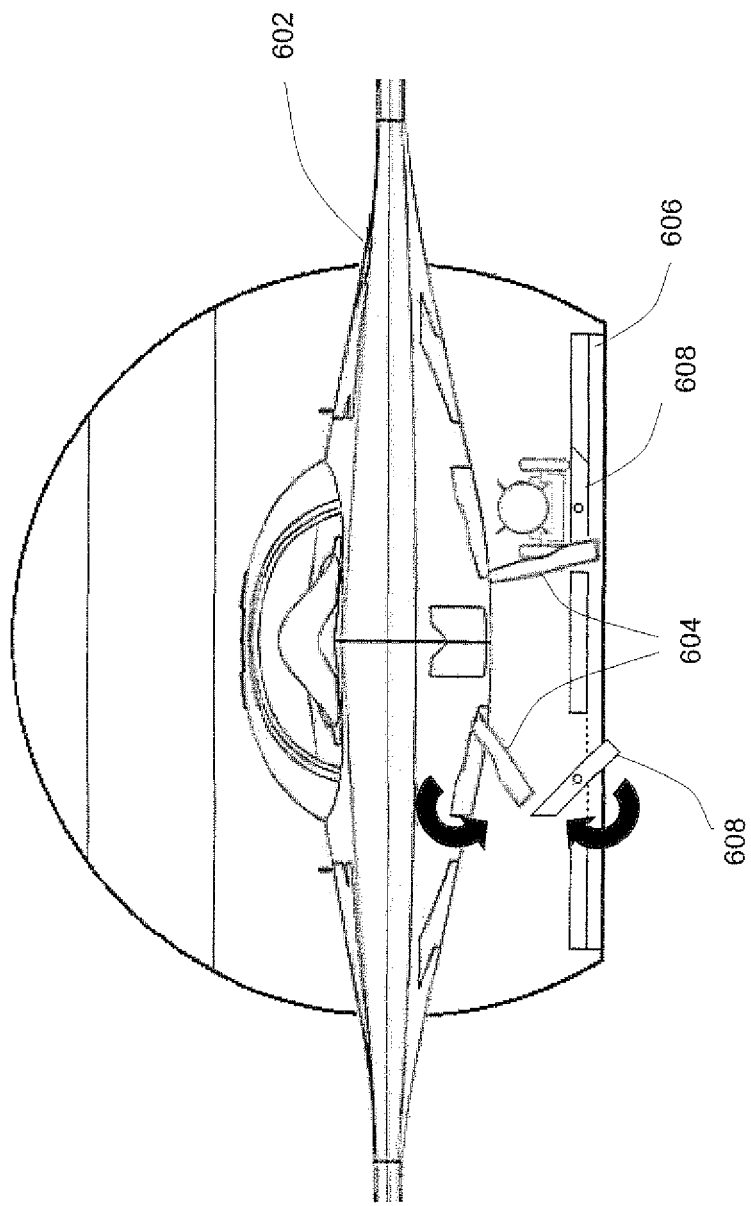

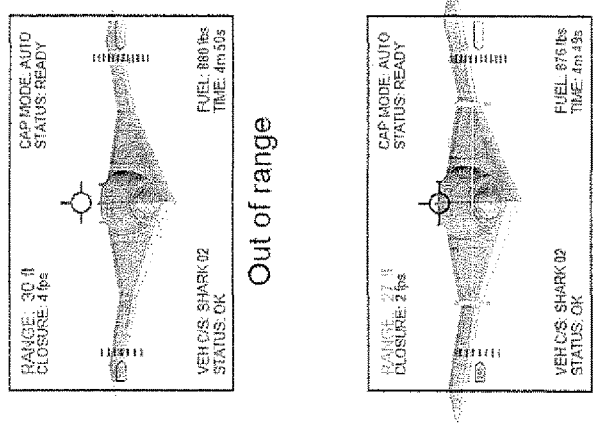
Figure 8B — Out of range
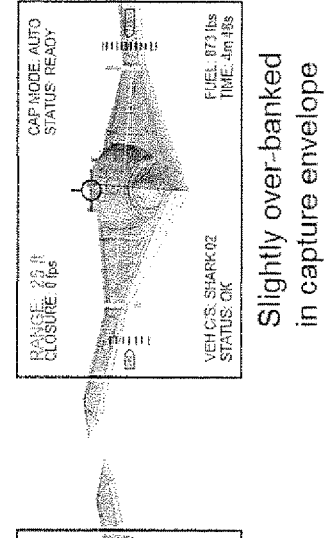
Figure 8C — Marginally in range — capture box appears
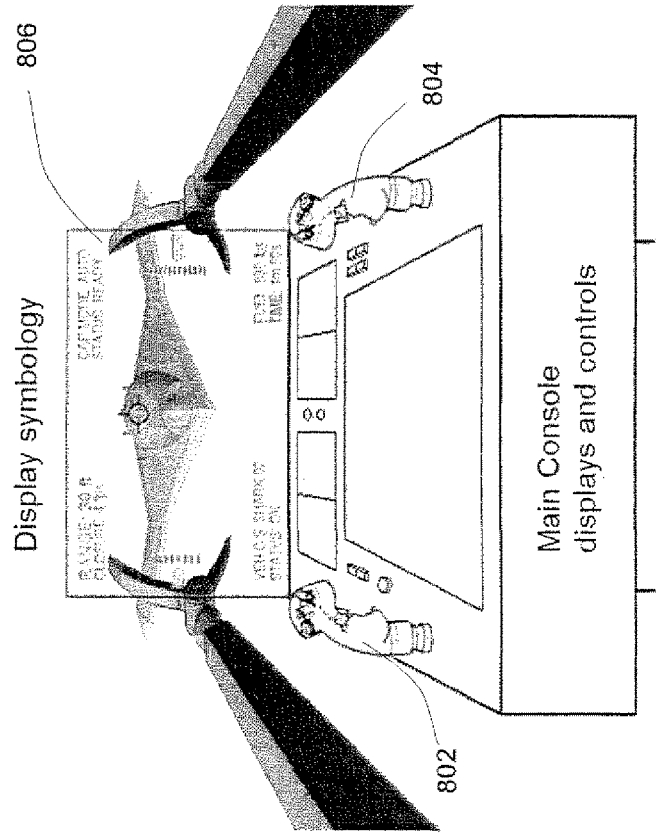
Figure 8A
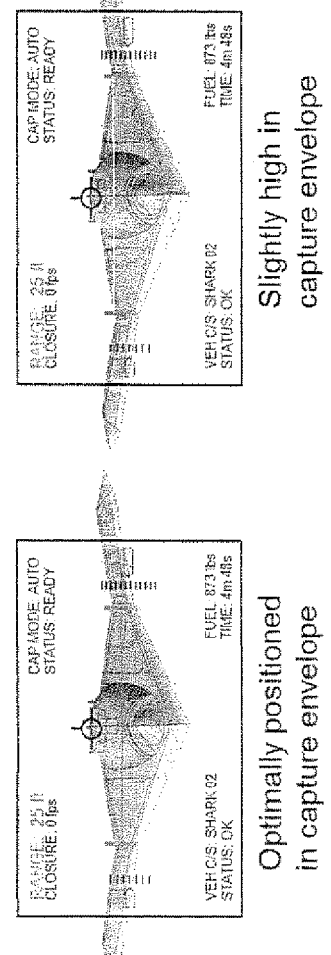
Figure 8F — Slightly over-banked in capture envelope
Figure 8E — Slightly high in capture envelope
Figure 8D — Optimally positioned in capture envelope

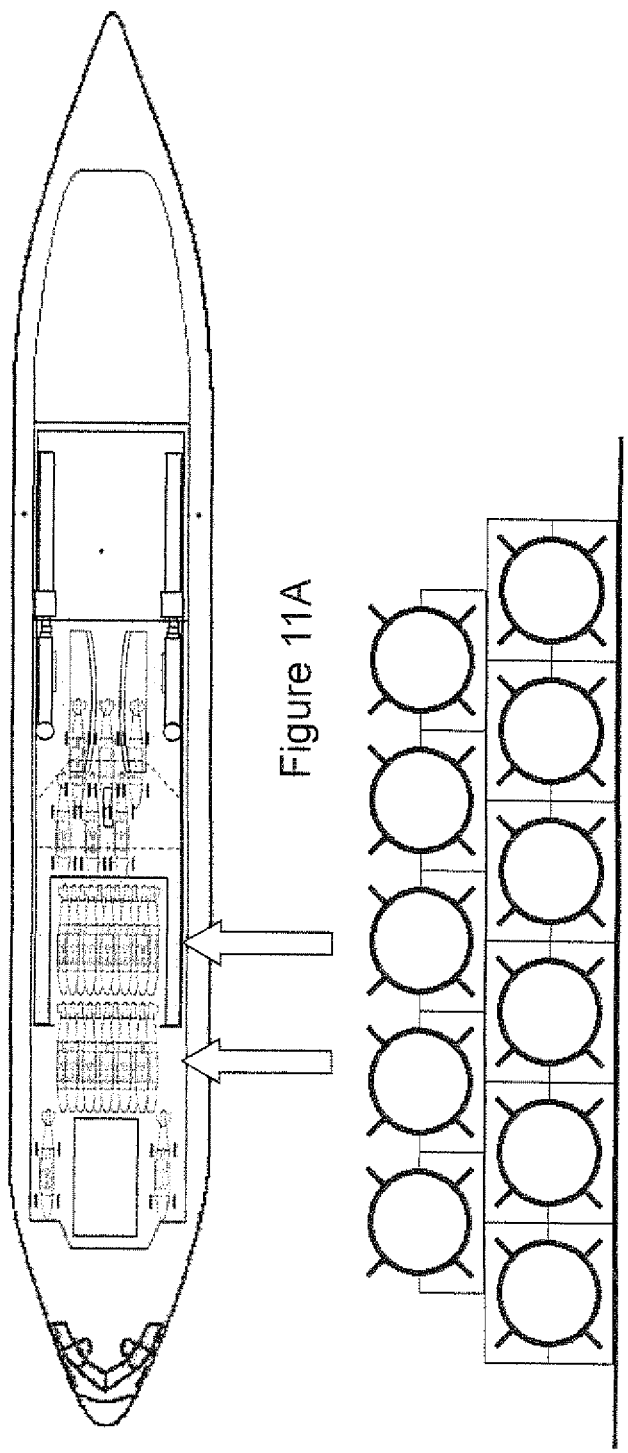

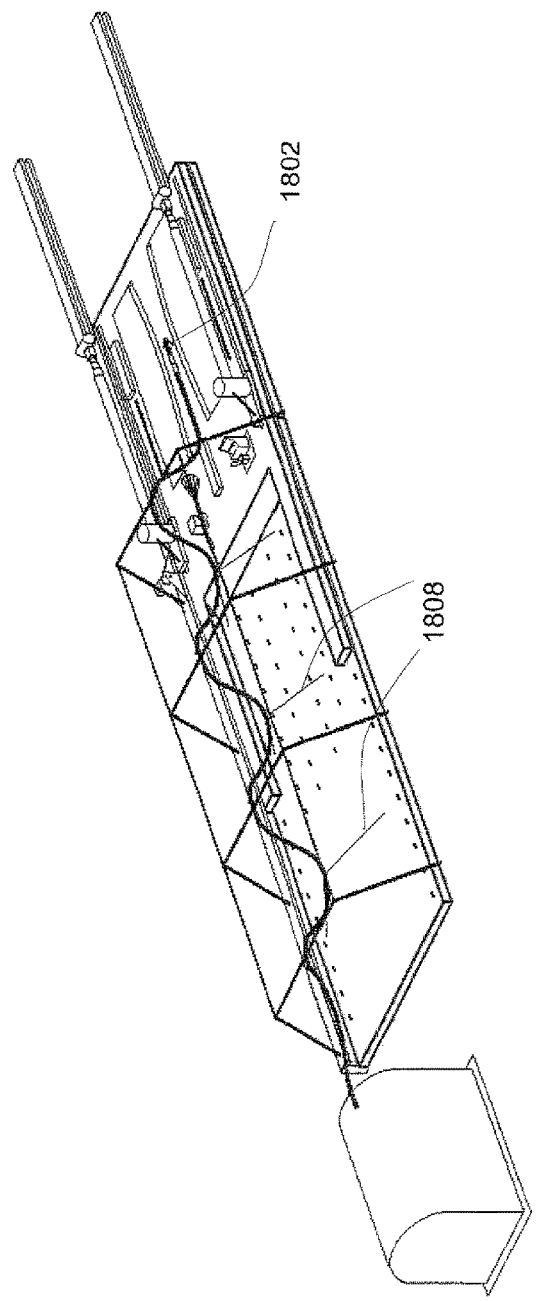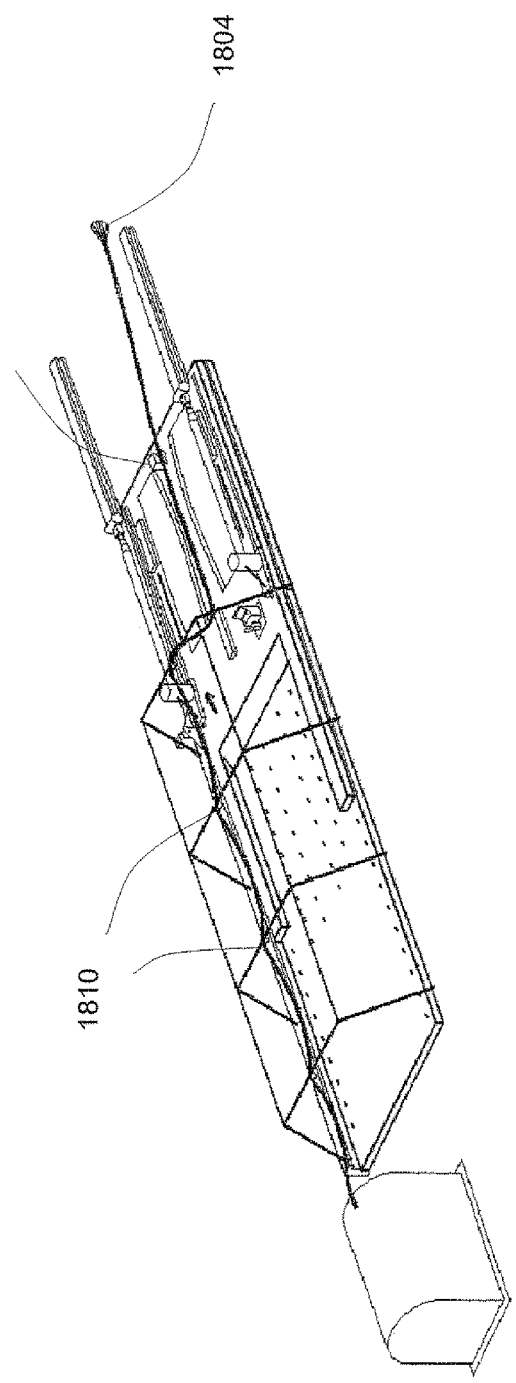
Figure 18A
Figure 18B

APPARATUS AND METHOD FOR AERIAL RECOVERY OF AN UNMANNED AERIAL VEHICLE

CROSS REFERENCE TO RELATED APPLICATIONS

This application claims the benefit of priority to Singapore Patent Application No. 10201600154W, filed Jan. 8, 2016. The contents of the referenced application are incorporated into the present application by reference.

FIELD OF INVENTION

The present invention relates broadly, but not exclusively, to an apparatus and method for aerial recovery of an Unmanned Aerial Vehicle (UAV) in mid-flight, and to a system and method for servicing an UAV in mid-flight.

BACKGROUND

Unmanned Aerial Vehicles (UAVs) have been in military service for decades, under various designations: drones, RPVs, RPAs, UASs, and UCAVs. They perform a variety of roles with both non-lethal and lethal payloads: reconnaissance, signals/intelligence gathering, persistent surveillance and strike/attack. They are especially useful for missions which are dangerous and would stretch an onboard human pilot's endurance, or which are not worth risking the pilot's life.

Without a human pilot on board, the UAV's limitations essentially come down to its range/payload. Although some UAVs such as the RQ-4 Global Hawk have very impressive range and endurance, most combat-intended UCAV (unmanned combat aerial vehicle) designs have much shorter range. Aerial refuelling has long been used to extend an aircraft's range, but it has been the nearly-exclusive preserve of manned aircraft. Only recently have the first trials been carried out that demonstrated the feasibility of UAVs to aerial refuel autonomously, and this capability will become commonplace in future.

For those UAVs with aerial refuelling capability and disposal payloads, i.e. ordnance, their last remaining limitation therefore becomes that of payload: once they have expended their ordnance, the UAVs must return to base to rearm, which may be many miles/hours of transit away. A potential need therefore exists, for a system that can retrieve UAVs in mid-flight, bring them aboard a servicing aircraft to refuel and rearm them, and re-release them in flight to continue with their mission, without the need for the UAVs to transit to/from their base.

There have been several historical programs aimed at extending the range/endurance of small (both manned and unmanned) aircraft, other than through aerial refuelling. In the late 1940's-early 1950's, the US Air Force (USAF) experimented with several concepts, including the "parasite fighter": a tiny fighter carried in the bomb bay of a bomber; the wing-tip attachment Projects Tip Tow and Tom-Tom; and the fighter conveyor (FICON) concept: a normal-sized fighter carried in the bomb bay of a very large bomber. When aerial refuelling capability became commonplace, all these concepts were abandoned.

A "mothership" concept that did become operational was the DC-130 drone controller program. In the mid 1960's-early 1970's, the USAF operated specially-equipped C-130 Hercules transports to launch Firebee/Lightning Bug drones from under wing pylons; after the drones completed their missions, they flew on to the recovery area, deployed a parachute and were retrieved in flight by helicopters. This concept employed different launch and recovery platforms, and there was no capability to refuel/rearm the drones in flight, which still had to be done back at base.

In the early 1970s', the USAF revisited the mothership concept again by commissioning the Boeing Aerospace Company to develop the micro-fighter/airborne aircraft carrier concept. The concept envisages the development of small manned "micro-fighters" capable of being carried in multiples aboard a large transport/cargo aircraft such as the Boeing 747 or Lockheed C-5. The micro-fighters are stowed in the cargo hold of the mothership, can be armed/fuelled, and their pilots can enter/exit the cockpits in flight. To launch the micro fighter, it is moved into position by a conveyor system over the launch bay. The launch bay inner pressure doors open and a mechanical trapeze arm system swings into position above the wings of the fighter and latches onto the attachment points. The arm lowers the fighter into the launch bay, after which the pressure doors close. The bay is then de-pressurised, the outer doors opened, and the trapeze lowers the fighter into the airstream where it is released. To retrieve the fighter in flight, it flies into formation with the mothership, where a refuelling boom extends to engage the receptacle of the fighter. The boom then maneuvers the fighter into the engagement envelope of the trapeze arm, which latches onto the attachment points. The fighter is then brought aboard in a reverse of the procedure described above. This Boeing concept comes closest to providing a "full service" capability in flight: enabling refuelling, rearming and even crew changes. However, it is wholly dependent on purpose-designed and built micro-fighters; and purpose-built variants of albeit existing transport/cargo aircraft designs, and would be impractical and cost-prohibitive to implement with an air force's existing fleet.

Two more recent concepts have been proposed by the USAF, and by FAR Technologies of Israel. In U.S. Pat. No. 6,932,299 B2, "Apparatus for aerial rearmament of aircraft" and U.S. Pat. No. 7,793,888, "Apparatus and method for air-to-air arming of aerial vehicles", they propose broadly similar concepts are disclosed that involve a transport aircraft extending a rigid telescopic boom, on which the ordnance transfer/loading device is conveyed to the recipient aircraft, formatting on the transport. In both concepts, the recipient aircraft is rearmed while flying in close formation with the transport aircraft, and the rearming is possible only with aircraft fitted with stores on external pylons (which are exposed and thus more easily "accessible"); they do not appear to have the capability to rearm aircraft equipped with internal weapons bays.

Both concepts also appear to be for rearming only and no refuelling; therefore if refuelling is required as well, the recipient aircraft would have to engage the tanker aircraft in a separate aerial refuelling procedure, which would extend the overall rearming/refuelling operation time. Similarly, both concepts do not allow for "basic maintenance" to be performed on the recipient aircraft in flight, e.g. the replacement of faulty avionics line-replaceable units (LRUs).

A need therefore exists to provide an apparatus and method for aerial recovery of an unmanned aerial vehicle that seeks to address at least some of the above problems.

SUMMARY

According to a first aspect of the present invention, there is provided an apparatus for aerial recovery of an Unmanned Aerial Vehicle (UAV) in mid-flight, the apparatus comprising: a rigid base having a first section and a second section pivotably connected to the first section, wherein the first section is securely mounted to a floor of an aircraft and the second section is configured to be locked to the first section when level with the first section; and a servicing platform moveably mounted to the base and configured to move along a direction parallel to a longitudinal axis of the aircraft such that in an extended position, the servicing platform at least partially protrudes from a rear cargo door of the aircraft, wherein the second section is configured to support the servicing platform in the extended position wherein the servicing platform comprises a capturing mechanism configured to capture the UAV in the extended position and a restraining mechanism configured to secure the UAV on the servicing platform.

The second section may further comprise a plurality of support beams configured to extend rearwardly of the aircraft for supporting the servicing platform in the extended position.

The capturing mechanism may comprise two telescopic arms, each telescopic arm being disposed on a transverse side of the servicing platform and configured to operate in six degrees-of-freedom.

Each telescopic arm may comprise a capture fork attached to a distal end of said arm, and wherein the capture fork is configured to engage a selected section of the UAV.

Each capture fork may comprise a pneumatic body configured to securely engage the captured UAV, the pneumatic body cushioning the selected section to protect the captured UAV.

Each capture fork may further comprise aerodynamic fairings configured to reduce drag on said capture fork.

Each capture fork may further comprise an articulation hinge configured to further reduce aerodynamic drag/buffeting on said fork.

The capturing mechanism may further comprise a jettison system disposed at the distal end of each telescopic arm adjacent to the associated capture fork, the jettison system configured to dismount the said capture fork from the telescopic arm in an emergency.

The apparatus may further comprise sensing means disposed on the two telescopic arms and configured to communicate with a control station.

The sensing means may include at least one of infrared sensors, vision system cameras and/or Lidar.

The apparatus may further comprise a restraining mechanism configured to translationally and rotationally secure the captured UAV relative to the servicing platform in the extended position.

According to a second aspect of the present invention, there is provided a system for servicing a UAV in mid-flight, the system comprising: a servicing aircraft; the apparatus for aerial recovery of a UAV in mid-flight as claimed in any one of the preceding claims disposed in the servicing aircraft; and a control station disposed in the servicing aircraft, the control station being in communication with the apparatus and configured to operate the apparatus.

The system may further comprise refuelling means for refuelling the captured UAV.

The refuelling means may comprise a pallet fuel tank attached to the servicing aircraft and connected to a fuel supply of the servicing aircraft, and a hose connected to the pallet fuel tank and suspended on a supporting frame.

An amount of fuel stored in the pallet fuel tank may be controllably variable for regulating a centre of gravity of the servicing aircraft.

The system may further comprise rearming means for rearming the captured UAV.

The system may further comprise a mission monitoring system for monitoring at least one parameter associated with the UAV and/or the servicing aircraft.

The mission monitoring system may be further configured to schedule the servicing of a plurality of UAVs operating in an area covered by the servicing aircraft.

The control station may be movable between a stowed position and an operating position, and wherein the control station maintains a direct line of sight with an approaching UAV at the operating position.

The control station may comprise a display configured to provide real-time positional data of the UAV.

The display may be an augmented-reality display configured to provide an indication of a position on the UAV that the capturing mechanism is expected to engage based on the positional data.

According to a third aspect of the present invention, there is provided a method for aerial recovery of a UAV in mid-flight, the method comprising the steps of: rearwardly extending a servicing platform relative to a rigid base mounted to a floor of a flying servicing aircraft such that the servicing platform at least partially protrudes from a rear cargo door of the servicing aircraft, wherein the base comprises a first section and a second section pivotably connected to the first section and wherein the second section is configured to support the servicing platform, flying the UAV in formation with the servicing aircraft within a capture envelope of a capturing mechanism disposed on the servicing platform; capturing the UAV using the capturing mechanism while the servicing platform is in the extended position; and securely supporting the UAV on the servicing platform.

The extending, flying and capturing steps may be performed manually.

The flying and capturing steps may be performed at least partly autonomously.

The method of capturing the UAV may comprise extending two telescopic arms disposed on the servicing platform rearwardly and downwardly; opening two capture forks, each attached to a distal end of the respective telescopic arm; engaging selected sections of the UAV using the capture forks upon confirmation that the UAV is within the capture envelope; and retracting the two telescopic arms to draw and position the captured UAV on the servicing platform.

The method may further comprise adjusting at least one of flight controls and a centre of gravity of the servicing aircraft while the captured UAV is positioned on the servicing platform.

There is also provided a method for servicing a UAV in mid-flight, the method comprising the steps of: flying a servicing aircraft; capturing the UAV using the method for aerial recovery of a UAV in mid-flight as defined in the second aspect; and servicing the captured UAV.

The method of servicing the UAV may comprise refuelling the UAV.

The method of servicing the UAV may further comprise rearming the UAV.

The method of servicing the UAV may comprise performing maintenance or replacement of a line replaceable unit.

The method may further comprise monitoring at least one parameter associated with the UAV and/or the servicing aircraft.

BRIEF DESCRIPTION OF THE DRAWINGS

Embodiments will be better understood and readily apparent to one of ordinary skill in the art from the following written description, by way of example only, and in conjunction with the drawings, in which:

FIG. 1A shows a perspective view illustrating an apparatus for aerial recovery of a UAV in a stowed position according to an example embodiment.

FIG. 1B shows a perspective view illustrating the apparatus of FIG. 1A in an intermediate position.

FIG. 6 shows a front view illustrating an example arming means of the apparatus of FIG. 1A comprising swivel doors according to an example embodiment.

FIG. 8A shows a schematic diagram illustrating a perspective view at the control station during a UAV recovery operation.

FIGS. 8B, 8C, 8D, 8E and 8F show example images of a UAV on the display of the control station of FIG. 8A.

FIG. 11A shows a plan view of an ordnance arrangement in a servicing aircraft for rearming the captured UAV according to an alternate embodiment.

FIG. 11B shows a front view taken along the longitudinal direction of the servicing aircraft of the ordnance arrangement of FIG. 11A.

FIG. 18A shows a schematic diagram illustrating a perspective view of an interchangeable refuelling apparatus configured for refuelling a recovered UAV on board a servicing aircraft according to an example embodiment.

FIG. 18B shows a schematic diagram illustrating a perspective view of an interchangeable refuelling apparatus configured for contingency off-board refuelling of a UAV flying in formation with a servicing aircraft.

DETAILED DESCRIPTION

Figure 1C:
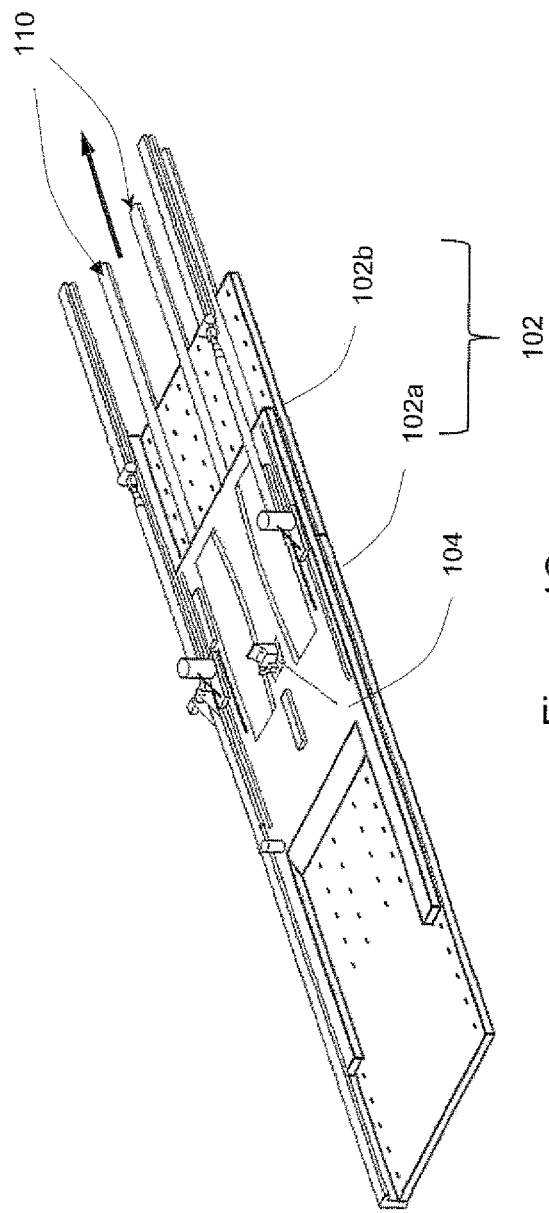
FIG. 1C shows a perspective view illustrating the apparatus of FIG. 1A in an intermediate position with the support beams extended.

Embodiments of the present invention provide methods and systems to retrieve a UAV in mid-flight, while flying in close formation with a servicing aircraft; bring it onboard the servicing aircraft for servicing: rearming with ordnance; refuelling; performing limited maintenance, if necessary; and release it back into flight to continue on its mission. The servicing aircraft may be any large, high performance transport aircraft equipped with an aft cargo door that can be opened in-flight, such as the Boeing C-17A Globemaster Ill., Lockheed C-5 Galaxy or Antonov An-124, while the UAV may be any design with an internal weapons bay and a high degree of autonomous operating capability, such as the Northrop Grumman X-47B.

FIG. 1A shows a perspective view illustrating an apparatus 100 for aerial recovery of a UAV in a stowed position according to an example embodiment. The apparatus 100 comprises a rigid base 102 having a first section 102a and a second section 102b, wherein the first section 102a is securely mounted to a floor of an aircraft (not shown in FIG. 1). The apparatus 100 further includes a servicing platform 104 moveably mounted to the base 102 and configured to move along a direction parallel to a longitudinal axis of the aircraft such that in an extended position, the servicing platform 104 at least partially protrudes from a rear (aft) cargo door of the aircraft. The servicing platform 104 comprises a capturing mechanism 106 configured to capture the UAV in the extended position.

The servicing platform 104 may further comprise of cutouts or swiveling doors, a retractable UAV support trestle system, a UAV hold down/restraint system, retractable personnel safety rails and a re-locatable control/display station 108 that controls operation of the servicing platform's 104 various components, performs tracking and remote control system of the UAV for capture and retrieval, and integrated ordnance transportation carts. The base 102 may act as a platform on which all other components of the system are mounted. This may enable the entire system to be loaded aboard the servicing aircraft at the same time. To optimise cargo floor space usage, a plurality of ordnance transport/loading carts may also be positioned on the base 102.

The second section 102b of the base 102 may be pivotable relative to the first section 102a and may comprise a plurality of support beams 110 configured to extend rearwardly of the aircraft for supporting the servicing platform in the extended position. The second section 102b may be connected to the first section 102a by hinges. As shown in FIG. 1A, the second section 102b may rest on a cargo ramp lower door of a servicing aircraft and has a 10° angle above the horizontal when stowed. The second section 102b may support the track movement of the servicing platform 104, and may prevent an "over-cantilevered" condition when the servicing platform 104 is fully extended, which would be the case if the base 102 did not extend onto the cargo ramp door.

A plurality of power cables for the capturing mechanism 106 may run through the hinges. The first section 102a may comprise a plurality of regularly spaced cutouts matching locations of the cargo hold floor tie-down points of the servicing aircraft. This may allow locking devices to be installed to secure the base 102 to these tie-down points. Unlike the first section 102a, the second section 102b is not attached to the cargo ramp lower door floor but merely rests on it. This is to allow the second section 102b to slide against the cargo ramp lower door when the latter lowers. As the cargo ramp lower door lowers, the second section 102b may move downward together with the cargo ramp lower door until it is level with the first section 102a. Further, the pivot hinge may comprise a locking device that locks the second section 102b when it is level with the first section 102a. This can prevent over rotation of the second section 102b and misalignment with the first section 102a, should the cargo ramp lower door move below the horizontal plane. The locking device may comprise of a powered dowel pin inserted into a plurality of pad eye-type lugs.

The base 102 may be flat, except at its left and right edges, and may further comprise a plurality of rails 112 to guide the movement of the servicing platform 104. The rails 112 may provide rigidity and strength to the base 102. The rails 112 may also be rigid and may be able to resist a bending moment that results when the servicing platform 104 is cantilevered out at maximum extension. The base 102 may comprise rollers to facilitate translation of the servicing platform 104. The base 102 may also comprise recessed tie-down points which may provide anchoring points for ordnance transport/loading carts.

In an example implementation, the first section 102a may be approximately 13.97 metres in length and 5.15 metres wide, while the second section 102b may be 6.50 metres long and 5.15 metres wide. Its thickness may be 20.3 centimetres and the base 102 may be made of metal.

FIG. 1B shows a perspective view illustrating the apparatus of FIG. 1A in an intermediate position. The servicing platform 104 may move aft/forward in a direction parallel to the longitudinal axis of the servicing aircraft with the use of rollers and rails 112 at the edges of the base 102. The servicing platform 104 may be powered by electrical motors and driven by sprockets along the rails 112. When the servicing platform 104 is stationary, it may be held securely in place by a locking mechanism that engages the base side rails 112.

The servicing platform 104 is used in the example embodiments to accommodate the UAV's wing span. The UAV may be too large to enter a cargo hold of the servicing aircraft and only the nose section of the UAV can fit in, leaving the rest of the UAV outside. Even with the cargo ramp door lowered, the part of the UAV that needs to be accessed—the weapons bays—is "hanging over the side." The servicing platform 104 provides a work surface for placing a plurality of UAV support trestles and the servicing crew to service the UAV.

The servicing platform 104 may further comprise two arms 113a, 113b on its transverse (left/right) sides which may provide adequate engagement with the base side rails 112 while reducing its surface area. A forward edge of the centre section of the servicing platform 104 may comprise a bevelled ramp to allow ordnance carts to roll easily between the base 102 and the servicing platform 104. In an example embodiment, the servicing platform 104 may be 13.97 metres long and 4.95 metres wide.

The servicing platform 104 may be constructed to be strong and stiff. This is because when deployed, the servicing platform 104 may be cantilevered and may support the weight of the UAV, ordnance carts, support trestles and servicing crew. Due to the high strength/stiffness requirement, the servicing platform 104 may be made of primarily composites and some metals. Its surface may also be coated with a non-slip material.

The electrical power to operate the servicing platform's 104 translating motor and other components, e.g. support trestle actuators, swivel door actuators, capturing mechanism and the control station, may be drawn from the servicing aircraft's onboard supply. Power/data cables to these components may be positioned within the thickness of the servicing platform 104 to keep its surface clear.

Figure 1D:
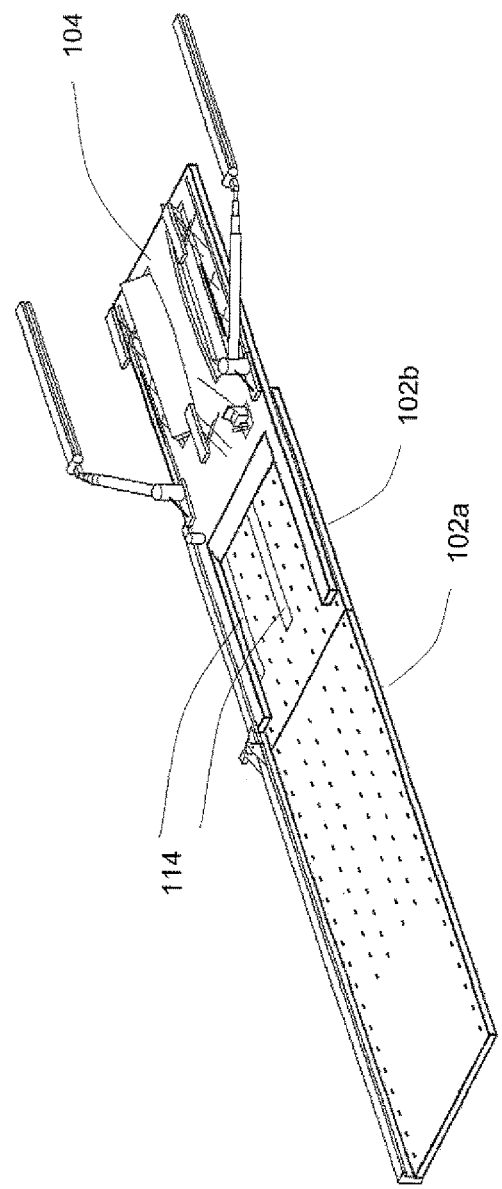
FIG. 1D shows a perspective view illustrating the apparatus of FIG. 1A in an extended position.

FIG. 1C shows a perspective view illustrating the apparatus of FIG. 1A in an intermediate position with the support beams extended. The plurality of support beams 110 on the second portion 102b may provide support to the servicing platform 104 at the extended position. The plurality of support beams 110 may be aligned at the same level with the surface of the base 102 and may be extendable and retractable using a rack and pinion mechanism, driven by a plurality of worm gears that may be connected to a plurality of electrical rotary actuators positioned within the thickness of the base 102. The plurality of support beams 110 may extend to approximately half the "overhang" of the servicing platform 104 in the extended position. When the plurality of support beams 110 are extended, troughs on the base 102 surface may appear which may hinder personnel and ordnance cart movement. These troughs may be covered up by a plurality of segmented covers 114 (as shown in FIG. 1D), attached directly to the support beams 110, and which are pulled to deploy/pushed to stow longitudinally by the support beams' extension/retraction.

Figure 1E:
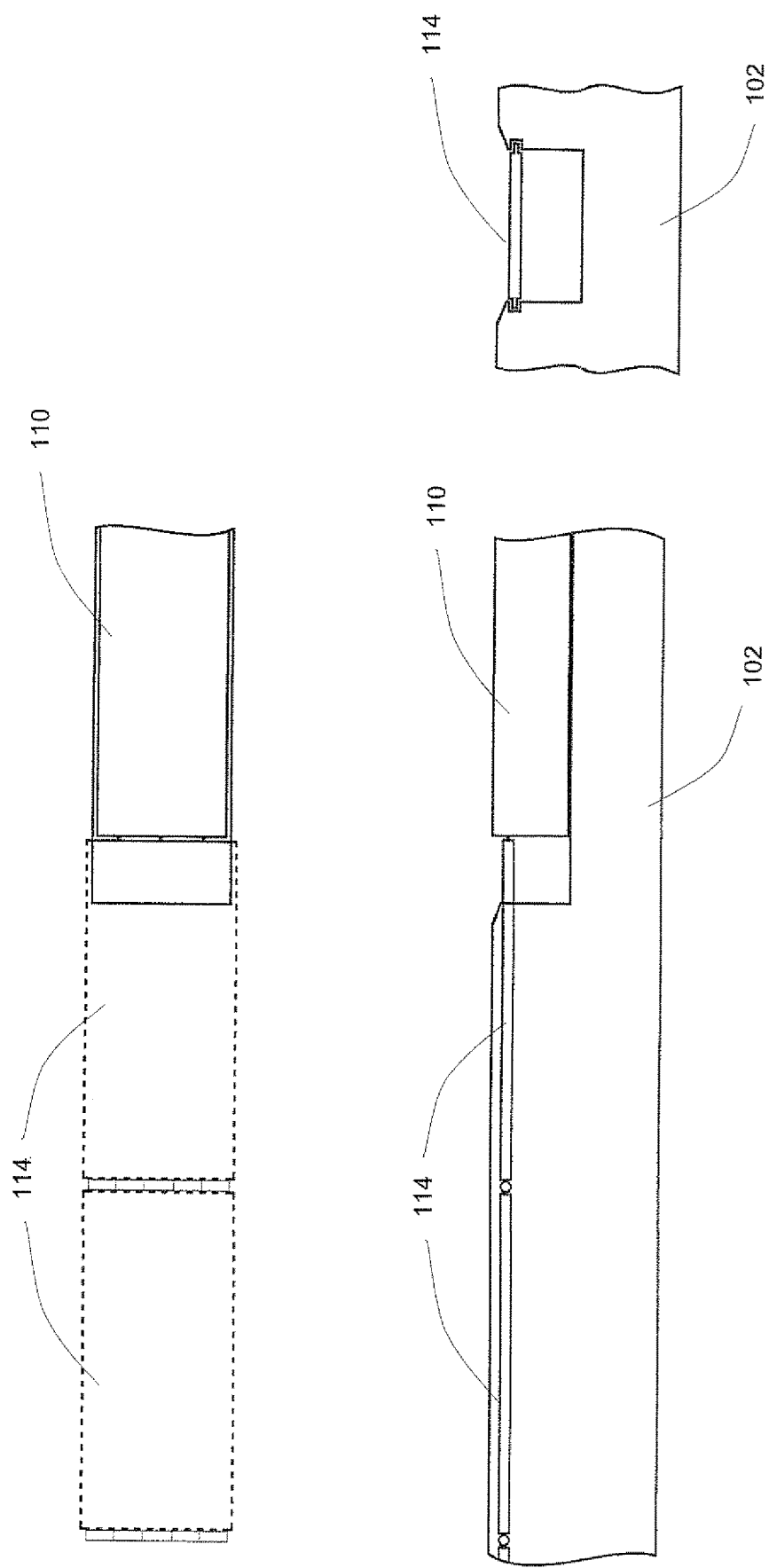
FIG. 1E shows a close-up view of the segmented covers of the apparatus of FIG. 1A according to an example embodiment.

FIG. 1E shows a close-up view of the segmented covers 114 of the apparatus of FIG. 1A according to an example embodiment. The covers 114 are made of segments connected to each other by hinges to minimise their individual lengths and potential misalignments in the tracks, and to enable the covers to straddle the hinge between the fixed and pivotable sections of the base 102.

Figure 2A:
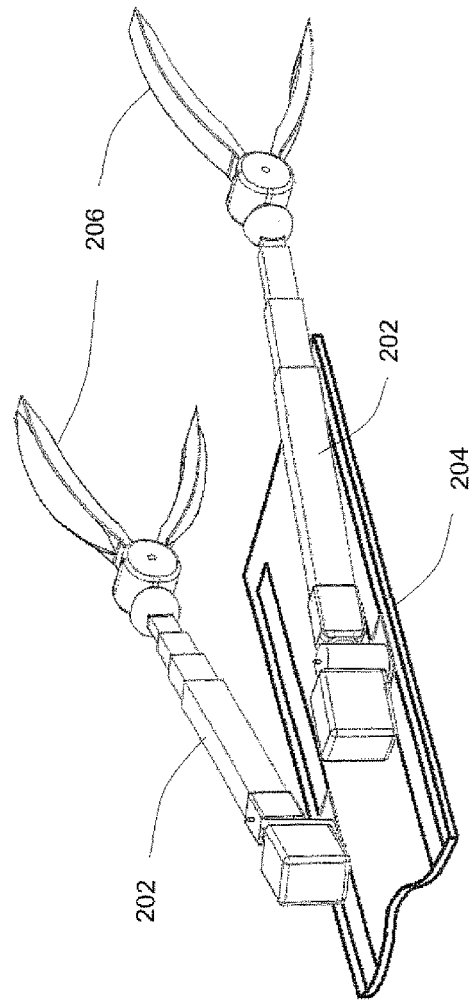
FIG. 2A shows a close-up perspective view illustrating two telescopic arms with respective capture forks of the apparatus of FIG. 1A according to an example embodiment.

FIG. 2A shows a close-up perspective view illustrating the capturing mechanism 106 of the apparatus of FIG. 1A according to an example embodiment. The capturing mechanism 106 comprises two telescopic arms 202, wherein each telescopic arm 202 is disposed on a transverse side of the servicing platform 204 and configured to operate in six-degrees of freedom. The telescopic arms 202 may have functioning similarity to lifting cranes. The main function of the capturing mechanism 106 is to deploy from a servicing aircraft to capture a UAV 208 (FIG. 2B) in mid-flight and retrieve the UAV 208 onboard safely for servicing and re-deploying/releasing it upon completion of the servicing.

Each telescopic arm 202 further comprises a capture fork 206 attached to a distal end of arm 202, and the capture fork 206 is configured to engage a section of the UAV 208. The capture forks 206 may operate in a pincer movement.

The telescopic arms 202 may reduce stowage space aboard the servicing aircraft, and provide the needed reach to extend out the servicing aircraft's cargo hold to capture and retrieve the UAV 208. Each of the telescopic arms 202 has 6-degrees of freedom of motion, which is rotatable about a pedestal of said arm, lateral and longitudinal pivoting of the arm 202, yaw rotation of the capture forks 206, pitch rotation of the capture forks 206 and opening/closing of the capture forks 206.

In addition, the capturing mechanism 106 may be able to translate forward/aft as it is being securely mounted on tracks in the servicing platform 204 to facilitate its stowage and deployment. When the capturing mechanism 106 is not translating, its motor brakes hold it securely in position, as the telescopic arms 202 are subject to significant aerodynamic drag forces when deployed, and more so when the UAV 208 is captured. The motors that pivot the telescopic arms 202 up/down may be configured to lift the arms' weight as well as the captured UAV's weight, even though the UAV 208 is generating lift that offsets its weight. All motions in the telescopic arms 202 may be electrically powered.

Figure 3A:
FIG. 3A shows a cross sectional view illustrating the capture fork of FIG. 2A according to an example embodiment.
Figure 3B:
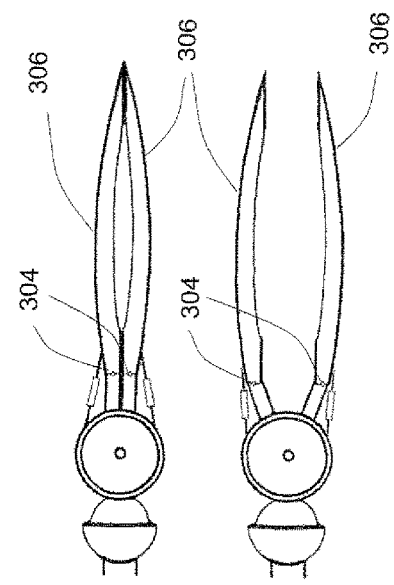
FIG. 3B shows a side view of the capture fork of FIG. 2A according to an example embodiment.
Figure 2B:
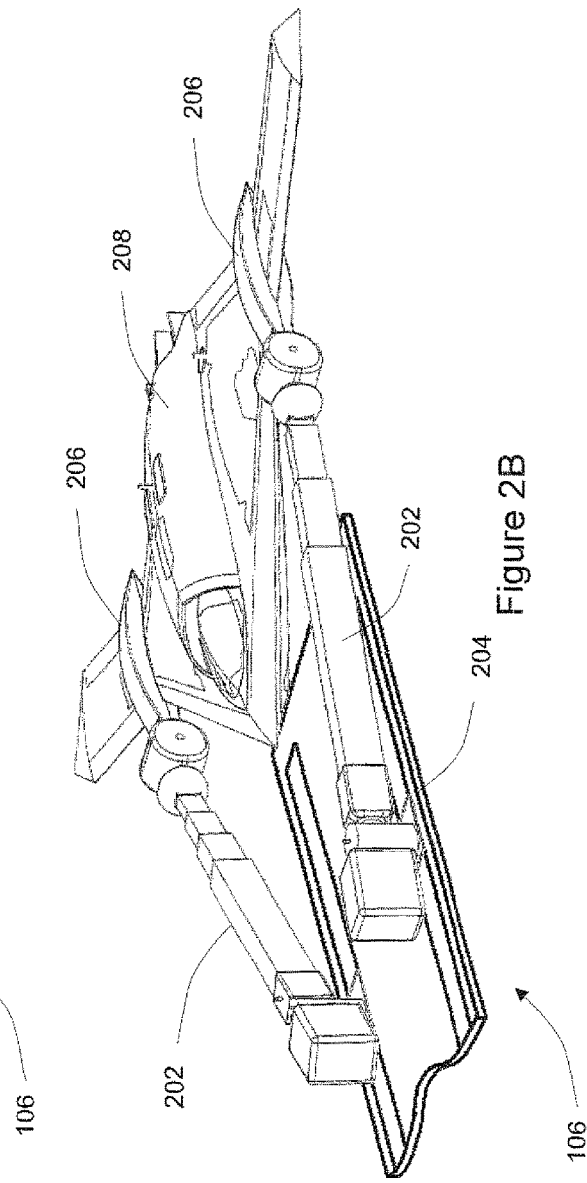
FIG. 2B shows a schematic diagram illustrating the aerial recovery of a UAV using the two telescopic arms of FIG. 2A according to example embodiment.

FIG. 2B shows a schematic diagram illustrating the aerial recovery of a UAV using the capturing mechanism 106 of FIG. 2A according to example embodiment. The capture forks 206 may be configured to engage the UAV 208 while it is in flight. The capture forks 206 may be hinged and actuated at a front end adjacent a distal end of respective arms 202 where they may be attached to a pitch/yaw swivel joint. The pitch/yaw joint may comprise of two hinges orthogonal to each other, or it may utilise a ball-joint mechanism. The capture forks 206 may be contoured longitudinally to better match a wing chord profile of the UAV 208, where the capture forks 206 will envelope it. The capture forks 206 may comprise a pneumatic body configured to securely engage the captured UAV 208 and provide cushioning means to protect the captured UAV 208. The pneumatic body may be positioned on the contact surfaces of the capture forks 206. The pneumatic body when inflated may provide a tight conforming hold on the captured UAV 208, while preventing damage to its surface. The outer (non-contact surfaces) of the capture forks 206 may further comprise aerodynamic fairings 302 (FIG. 3A) configured to reduce drag on the captured forks. The otherwise flat surface of the capture forks 206 may create significant drag when opened, possibly causing buffeting and shaking of the telescopic arms 202. An alternative embodiment as shown in FIG. 3B may be utilised. In this embodiment, an additional degree of articulation may be added, for example, by using articulation hinges 304. The hinges 304 may allow the capture forks 306 to open and close while remaining parallel to the local airflow to minimise buffeting.

Figure 4A:
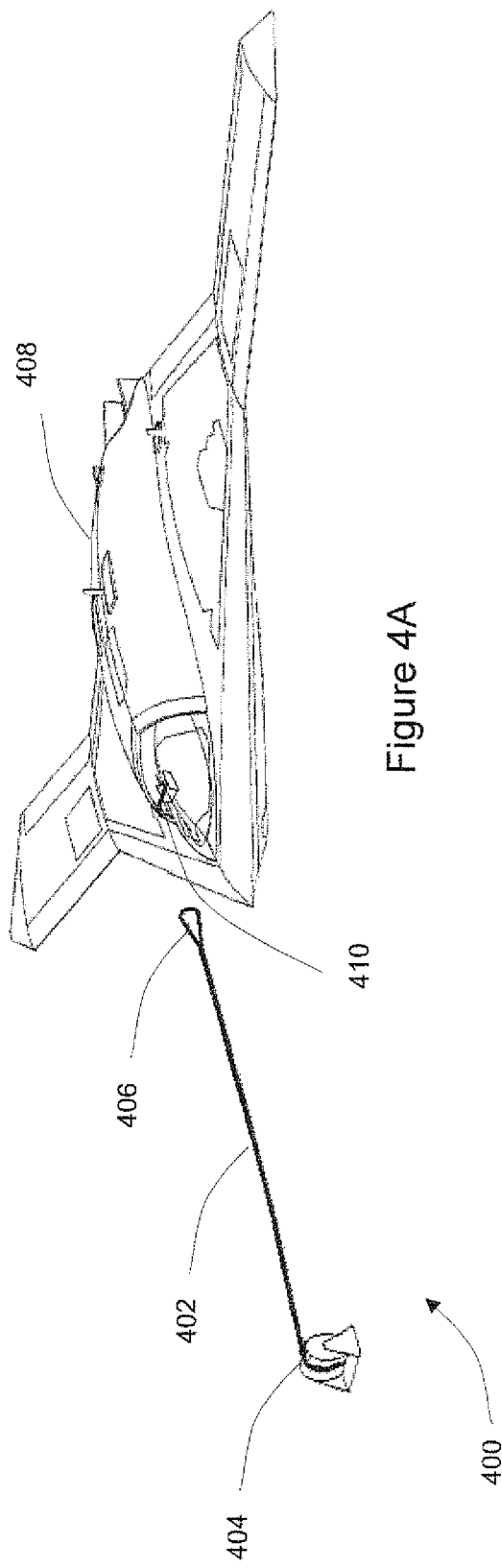
FIG. 4A shows a schematic diagram illustrating an aerial recovery of a UAV using a flexible method according to an example embodiment.
Figure 4B:
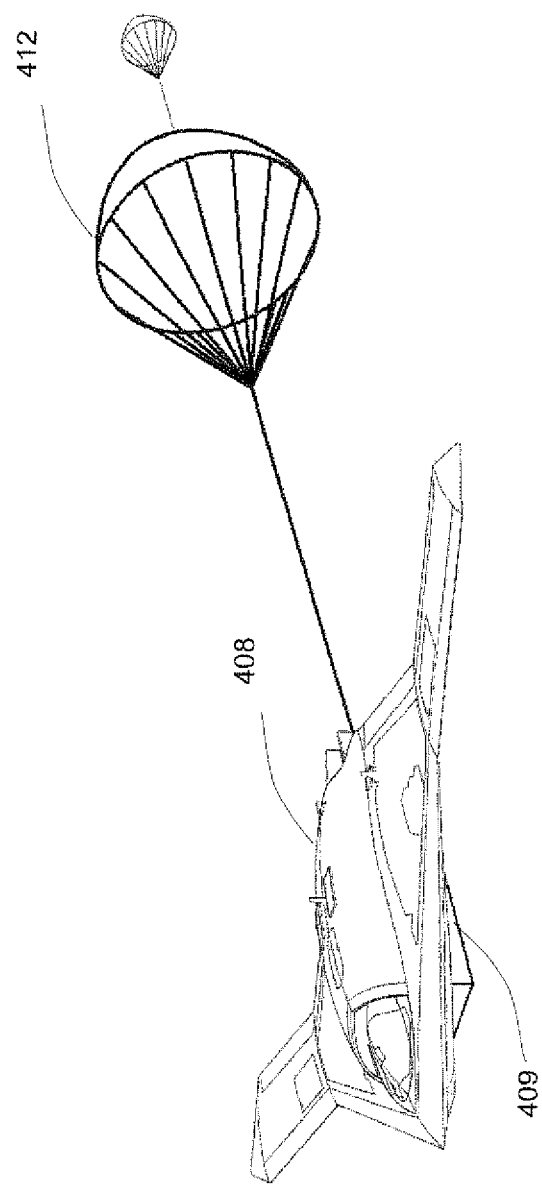
FIG. 4B shows a schematic diagram illustrating an aerial redeployment of a UAV after the parachute on an extraction pallet is deployed during a redeployment operation.

FIG. 4A shows a schematic diagram illustrating capturing mechanism 400 according to an alternate embodiment. In this alternate embodiment, the capturing mechanism 400 comprising a cable 402 reeled out of a dispenser 404 in the open cargo door of the servicing aircraft may be used instead of the capture mechanism 106 shown in FIG. 2A. Disposed at the end of the cable 402 is a capture device 406 to engage the UAV 408. The capture device 406 may engage a retractable "tow probe" 410 mounted on the centreline of the UAV 408, similar to a retractable in-flight refuelling probe. The UAV 408 typically approaches and engages the capture device 406 in a procedure similar to probe/drogue aerial refuelling. When the capture device 406 has latched onto the tow probe 410, the cable 402 is reeled in to pull the UAV 408 towards the servicing aircraft. In an alternate embodiment, to redeploy the serviced UAV 408, it may be placed on an extraction pallet extraction pallet 409. A parachute 412 disposed on the extraction pallet 409 is deployed to pull the UAV 408 out of a cargo hold of the servicing aircraft (as shown in FIG. 4B). The cable reel 402 has certain advantages, such as lighter weight and reduced system complexity. However, certain issues such as flight control of the UAV 408 during capture, release of the captured UAV, etc. may have to be resolved.

The capturing mechanism 106 as described with reference to FIG. 2A may be preferred over the capturing mechanism 400 shown in FIG. 4A and the deployment mechanism shown in FIG. 4B. With the UAV being held firmly while transiting the critical airflow field in the servicing aircraft's wake, the UAV is no longer "floating" and its flight control system (FCS) can relinquish control, alleviating concerns about FCS responsiveness and controllability; it also has the ability to redeploy the UAV without requiring disposal components, as with the mechanism in FIG. 4B.

Referring to FIG. 2B, although the telescopic arms 202 are intended to operate symmetrically in unison, in operation it may not transpire that way, as it depends on whether the UAV 208 is captured exactly symmetrically by the telescopic arms 202. Due to the vagaries of operations, the telescopic arms 202 may grasp the UAV 208 slightly offset laterally on either side. In such circumstances, to draw the UAV 208 into a cargo hold of the servicing aircraft while aligning it with the centreline of the servicing aircraft requires the telescopic arms 202 to rotate and telescopically retract in a coordinated manner but at slightly different rates. A telescopic arm control system may synchronise the movement of the left and right arms 202 to achieve this and "land" the UAV 208 with its centreline as closely aligned to the servicing platform's 204 centreline as possible. This positioning accuracy may be important as, if the UAV is "landed" too far off to one side, its weapons bay doors will not be able to operate and open in conjunction with the swivel doors on the platform, described below. The Lidar in the operator control station may be used to determine the UAV's lateral offset in its "landing approach", and control the left/right telescopic arm synchronisation.

The telescopic arms 202 may comprise sensors and instruments disposed therein and configured to communicate with a control station. The sensors and instruments may include at least one of infrared sensors, vision system cameras and/or Lidar. The sensors and instruments feed all aspects of the UAV's and capturing mechanism's position and the capturing operation to an operator control station computer. These aspects may include pedestal longitudinal position on the tracks, telescopic arm 202 horizontal rotation and vertical elevation angles, telescopic arm 202 telescoped length, capture fork 206 pitch/yaw angles and open angles. This information serves the "envelope protection" safety function of the computer, to ensure that movements of the telescopic arms 202 will not cause it to strike the servicing aircraft's structure.

For example, the pedestal of the arms 202 may serve as the mounting point for some of the vision system cameras, as they are the nearest point to the UAV 208 that is not on the servicing aircraft's structure. The position of the cameras also provides a perspective of the UAV 208 that aids the vision system displaying images of the UAV's approach to a capture controller.

In an example implementation, the telescopic arms 202 may have a telescoping reach of approximately 8.50 metres and a maximum depression angle of 30° below the horizontal plane. However these figures are dependent on the distance at which the UAV 208 can achieve safe and stable formation flight below/behind the servicing aircraft, which then determines a capture envelope.

After the UAV 208 is captured and brought onboard the servicing aircraft, it needs to be held securely with respect to the servicing aircraft to enable it to be serviced. In particular, the ordnance loading operation requires a plurality of bomb rack hooks in the UAV's weapons bays to be static in order to enable a plurality of bomb suspension lugs to be aligned. If the captured UAV 208 shifts due to turbulence or servicing aircraft maneuvering, it may jeopardise the rearming operation or injure the servicing crew.

The captured UAV 208 needs to be restrained longitudinally, laterally and vertically. The apparatus 100 in FIG. 1A may further comprise a restraining mechanism configured to transitionally and rotationally secure the captured UAV 208 relative to the servicing platform 204 in the extended position. The lateral restraint may be provided by the telescopic arms 202 which hold the UAV 208 and are locked in rotation. The locking of the telescopic arm 202 pedestal on its tracks may further provide the longitudinal restraint.

The vertical restraint needs to be robust, as the UAV's outer wing panels are still exposed to the airflow and thus generating lift. For vertical restraint, several methods may be used: The telescopic arms 202 may be locked in vertical pivot, a vertical push-down mechanism or a vertical pull-down mechanism.

The telescopic arms 202 may simply make use of its vertical pivoting capability to lock the arms 202 in position or exert a slight down rotation to firmly press the UAV 208 onto its supports.

Figure 5A:
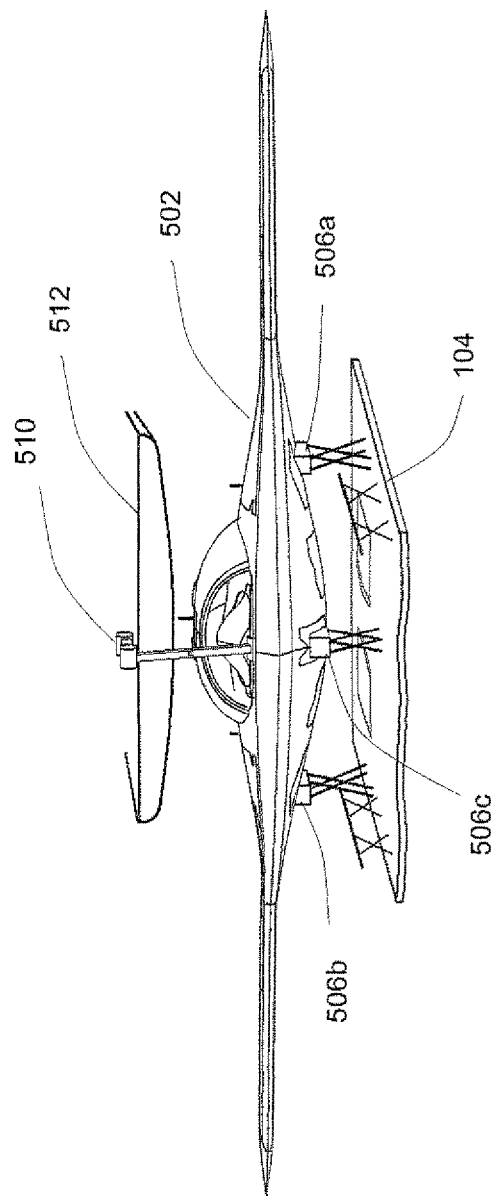
FIG. 5A shows a perspective view illustrating an example push-down restraining mechanism of the apparatus of FIG. 1A according to an example embodiment.
Figure 5B:
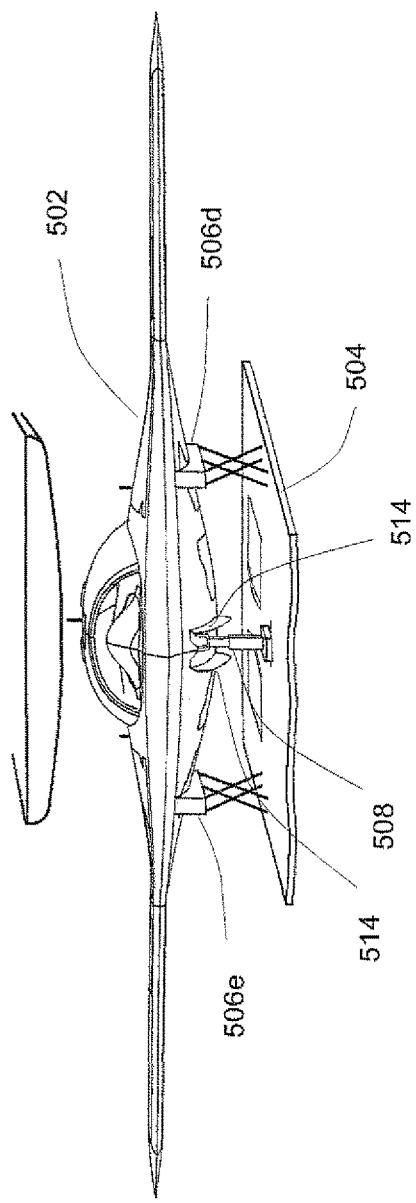
FIG. 5B shows a perspective view illustrating an example pull-down restraining mechanism of the apparatus of FIG. 1A according to an example embodiment.

FIGS. 5A and 5B provide examples of vertically restraining a captured UAV 502. As shown in FIG. 5A, the captured UAV 502 may be supported on the servicing platform 104 (FIG. 1A) by the support trestles 506a 506b 506c, as the captured UAV 502 does not lower its own landing gear. There may be three support trestles 506a 506b 506c on the servicing platform 104, positioned approximately at a position of the landing gear struts of the captured UAV 502. When stowed, the trestles 506a 506b 506c lie flat on the servicing platform 104 surface, but when deployed they extend vertically using a scissors lift mechanism. The extension may be powered by electrical actuators or self-contained electro hydraulic actuators. The trestles' support pads may be made of rubber or other conformable material to provide good surface contact with the captured UAV's 502 external skin and are sufficiently sized to avoid local deformation of the external skin of the captured UAV 502 from supporting its weight.

The vertical push-down mechanism 510 may be a device attached to the inside of the upper cargo ramp door 512. When not in use, it is power-folded and stowed out of the way. When deployed, it rotates forward and downwards into position and its contact pad presses the upper nose section of the UAV 502 firmly onto its supports. The contact pad may be lined with a conformable material such as rubber or an inflatable bladder to provide good surface contact and avoid damaging the UAV's 502 skin. A force sensor may be included in the deployment mechanism to avoid over-application of the restraint force. While the push-down mechanism 510 may be installed separately as it is not part of the base plate/servicing platform 504, it leaves the platform 504 clear for the placement and movement of other equipment.

In an alternative configuration, as shown in FIG. 5B, the support trestles may comprise of longer two side supports 506d 506e, instead of three, and may provide adequate longitudinal support for the captured UAV 502. This would permit the centre trestle 506c to be eliminated. Such a configuration may have the advantage of keeping the centreline of the servicing platform 504 clear, easing the movement of personnel and equipment. This may also facilitate the incorporation of a vertical pull-down restraint mechanism 508 and may permit the length of the personnel safety rails to be reduced.

The vertical pull-down mechanism 508 may be similar conceptually to the recovery assist secure and traverse (RAST) systems used aboard naval vessels to capture and reel in helicopters in rough sea states. The mechanism 508 may be a vertical gripper arm mounted on a base that may provide a limited degree of longitudinal/lateral movement. After the UAV 502 is brought aboard the servicing aircraft and placed on the support trestles 506d 506e, its nose landing gear (NLG) doors 514 are commanded to open, while the NLG strut remains retracted. The gripper arm is positioned directly below the NLG strut linkage, extends vertically upwards, opens its fingers, clasps the linkage, and pulls down on it to hold the UAV 502 firmly against the support trestles. Besides providing vertical restraint, this mechanism 508 also serves as the nose support, replacing the removed centre support trestle 506c. The gripper arm's positioning can be done with the aid of a vision camera system and lighting pointing up into the UAV's NLG bay, and the operation may be controlled manually by an operator at the control station, or automatically by the control station computer. The base and mast of the gripper arm may be removed to minimise obstruction to personnel and equipment movement while loading the entire system module into the servicing aircraft, and reinstalled subsequently.

For maximum effectiveness, the vertical restraint system may comprise of a combination of the above two embodiments instead of just one, to ensure application of the down force over the entire UAV airframe. This may be a combination of the telescopic arm/upper door push-down mechanism 510, or a combination of the telescopic arm/NLG pull-down mechanism 508.

FIG. 6 shows a front view illustrating an example arming means of the apparatus of FIG. 1A comprising swivel doors according to an example embodiment. Due to height constraints in the cargo hold, the UAV 602 may not be mounted high enough on the support trestles to allow its weapons bay doors 604 to open fully. At the height it can be mounted, the bay doors 604 would hit the platform surface 606 even when just partially open. To overcome this constraint, the servicing platform 606 may be equipped with a pair of swiveling doors 608 to accommodate the weapons bay doors 604. The swivel doors 608 are sized to match the weapons bay door 604 length, and positioned directly beneath the weapons bay doors 604. The inboard edge of the swivel doors 608 and platform gap (further described below) are curved to follow the profile of the weapons bay doors 604. The swivel doors 608 may be driven by rotary actuators embedded within the thickness of the servicing platform 606.

Before the weapons bay doors 604 open, the swivel doors 608 will rotate to a predetermined angle, e.g. 45°, providing clearance for the weapons bay doors 604 to lower. When the bay doors 604 have fully opened, the swivel doors 608 rotate back to their flush position, to allow the rearming operation to proceed. The sequence is reversed when the weapons bay doors 604 are to be closed. A gap or slit between the swivel doors 608 and servicing platform 606 allows the lower edge of the weapons bay doors to protrude below the level of the platform 606. This gap is of no consequence when the servicing platform 606 is not deployed: when stowed, the slit is covered by the base plate structure directly below. However, temporary covers can be placed over the slits, to prevent personnel from inadvertently stepping into, or ordnance transport cart wheels from lodging in them. These covers would be removed and stowed by the servicing crew just before the servicing platform 606 is deployed.

Figures 7A, 7B:
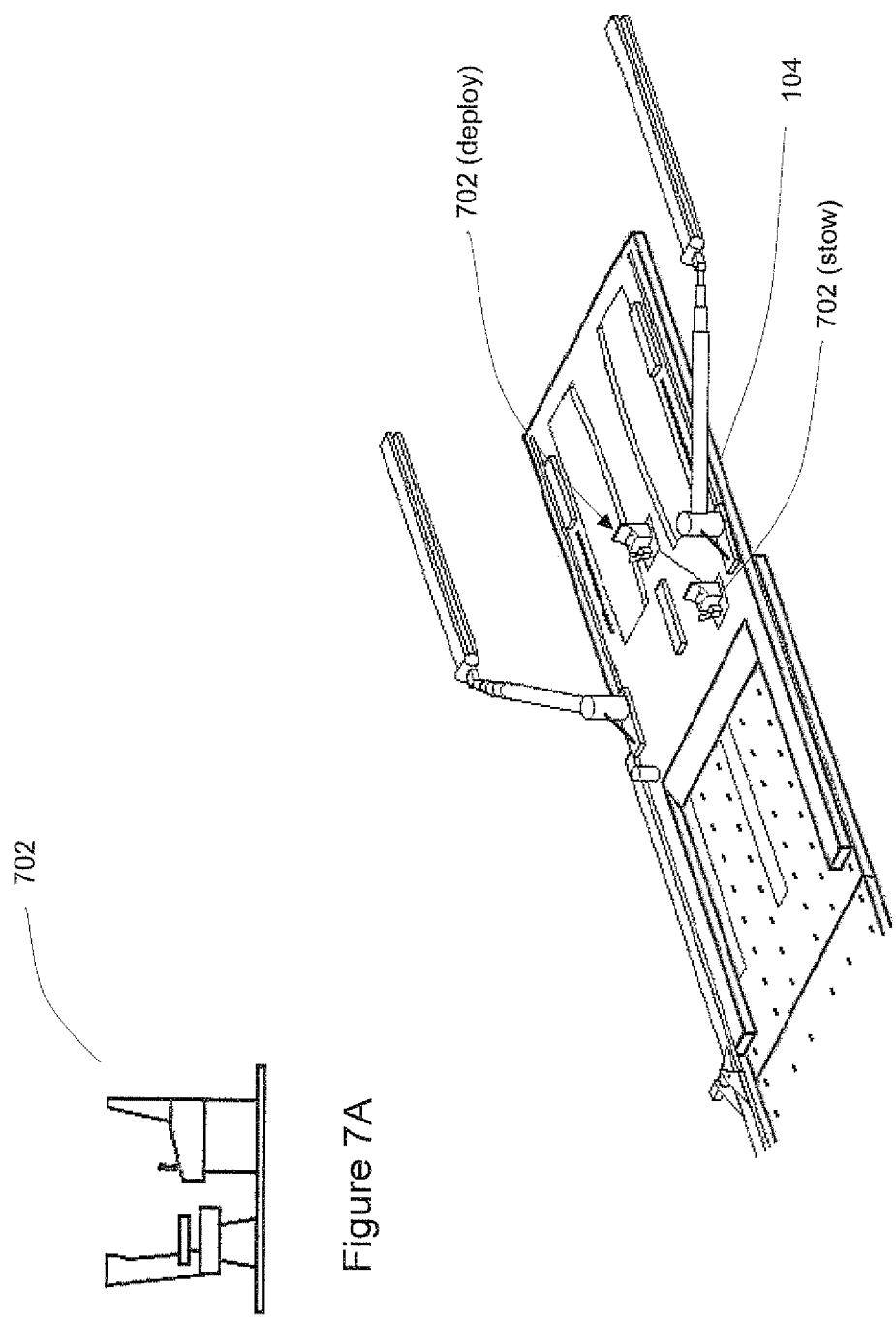
FIG. 7A shows a side view of a control station according to an example embodiment.
FIG. 7B shows example positions of the control station on the servicing platform of the apparatus of FIG. 1A according to an example embodiment.

FIG. 7A shows a side view of a control station 702 according to an example embodiment and FIG. 7B shows example positions of the control station 702 on the servicing platform 104 of the apparatus of FIG. 1A according to an example embodiment. A capture controller manages the UAV capture operation through the control station 702 positioned on the servicing platform 104. The control station 702 may be a reposition-able item, whereby it may be mounted on its own pallet and located at a particular spot on the servicing platform 104 for the capture operation, but stowed when not in use. The control station 702 looks directly out the open cargo ramp, and has a direct line of sight to the approaching UAV. To facilitate repositioning of the pallet, the control station 702 may be track or rail-mounted on the servicing platform 104, to shift between the stowed and deployed positions. When the UAV has been captured and is being brought aboard, the capture controller controls the pallet to roll back to its stowed position, to clear the servicing platform 104 for capturing the UAV, as well as for the controller's own safety. This movement may be through electrical motors.

The control station 702 may be considered as the "brains" of the concept: an operator console has controls for manipulating the movement of the telescopic arms to extend/retract, traverse left/right and up/down, and command capture forks to open/close. Other major functions include controlling the UAV in the semi-autonomous capture mode, and emergency functions. Further functions of the control station 702 may include extending/retracting the UAV support trestles; activating the vertical restraint system; personnel safety rails; operating swivel doors, longitudinal translation of the entire servicing platform; and controlling the fuel hose drum reel operation during contingency aerial (i.e. off-board) refueling of the UAV.

The control station chassis houses Lidar sensors for determining the distance/rate of closure of the UAV and lateral/vertical position relative to the servicing aircraft; a computer/datalink for communicating with and controlling the UAV; and vision system cameras (normal and low light level or infra-red cameras for night operations).

FIG. 8A shows a schematic diagram illustrating a perspective view at the control station 702 (FIG. 7A) during a UAV recovery operation. In FIG. 8A, the control station comprises manipulating means in the form of joysticks 802, 804 and a display 806 providing a user interface. The display 806 may contain a transparent screen through which the controller views the UAV, akin to the head-up display (HUD) used on various manned combat aircraft. The display 806's transparency may overlay data and symbology such as capture mode (autonomous or semi-autonomous); UAV identity/status, fuel state; distance/closure rate of the UAV; capture range status using colour for intuitiveness, e.g. red for out-of-range (FIG. 8B), yellow for marginal (FIG. 8C), green for optimum (FIG. 8D). Other positions of the UAV, such as those in FIGS. 8E and 8F, may also be indicated. Once within range, a "capture box" symbology may be displayed, indicating where the capture forks would contact the UAV airframe, were it to continue on its current trajectory. This is analogous to the weapons delivery continuously computed impact point (CCIP) mode on aircraft HUDs, and is to help the controller manoeuvre the telescopic arms or UAV so that the capture forks make contact at the intended position, which is just inboard of the UAV's wing fold joint. The capture box display may be dynamic, due to the relative motion between the UAV and servicing aircraft, and also telescopic arm movement. In other words, the display 806 can be implemented as an augmented-reality display that provides an indication of a position on the UAV that the capturing mechanism is expected to engage based on the dynamic positional data. For night and covert ("lights out") captures, the display 806 may be night vision goggle-compatible, or it may also display infra-red imagery of the UAV. In this example the control station 702 is shown configured for a single controller; however should operational requirements or workload considerations dictate two controllers, it may be expanded to accommodate so. Alternatively, the controller(s) may use a helmet-mounted 3D display where the above information is projected on the helmet visor, eliminating the need for the display screen.

Figure 9:
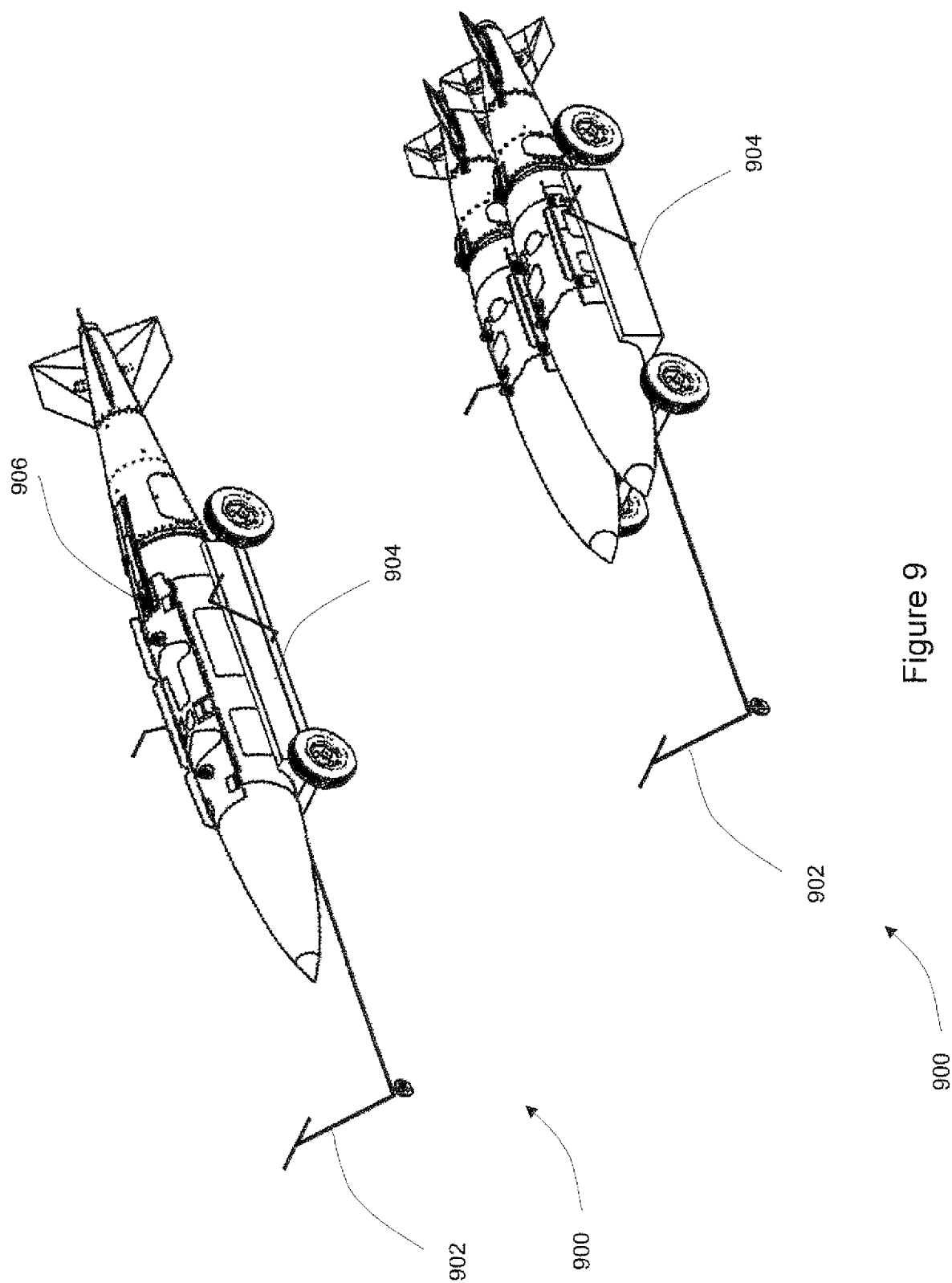
FIG. 9 shows perspective views of ordnance transport/loading carts according to an example embodiment.

The system of the example embodiments also allows rearming the captured UAV with suitable ordnance. The ordnance loading cart may be adapted from existing designs; particularly those used onboard aircraft carriers. As shown in FIG. 9, the ordnance cart 900 may be a wheeled dolly to manoeuvre its bomb cargo about on the transport's deck, from its storage spot to the loading position on the UAV. A detachable T-handle 902 attached to the front wheel axle permits manual steering. The bomb 906 is supported on a cradle 904 which is raised vertically into position to engage the bomb racks in the UAV's weapons bay. The cradle 904 orientation may also be fine adjusted longitudinally/laterally and in pitch/yaw to facilitate alignment of the bomb mounting lugs with the bomb rack mounting hooks. The lifting/fine adjustment mechanism may be hydraulic-powered or use a mechanical screw jack and be manually operated, or it may be electrically motor-operated to ease and speed up the weapon load crew's task. Movement of the cart 900 may be by manual or powered-assisted means, as described next.

The main distinguishing feature of the cart is its low profile, to fit underneath the UAV's low clearance. The low profile means the servicing crew has to stoop low to push the cart; to avert this, detachable side pusher handles may be used to facilitate the pushing. The cart may also be pulled by an electric winch located on the servicing platform, with the cable being attached to the cart chassis. This may be the preferred method if the servicing crew has difficulty pushing the cart up the servicing platform's ramp. The cart shown is for transporting a single 2,000 lbs GBU-31 GPS-guided munition; for the smaller 1,000 lbs GBU-32, two can be carried in a side-by-side arrangement on the cart cradle, which enables the number of munitions carried by the servicing aircraft to be doubled. This cart's adjustment mechanism differs in that each bomb's cradle can be raised individually; this is to prevent blocking access to the bomb racks, which would occur if both bombs were raised simultaneously side-by-side.

Each cart has a parking brake, to hold it in place and prevent rolling as the aircraft's pitch attitude changes. The brake may be a simple manually activated device, or it should preferably be an electrically actuated device activated by remote control, to facilitate speed of operation. The brakes may be controlled individually cart-by-cart, or all carts within a row may be controlled together, for reasons explained below. To prevent the carts from lifting off the deck in the event of turbulence, each is secured to the cargo hold floor or base plate where it is parked by quick release tie-downs.

Figure 10A:
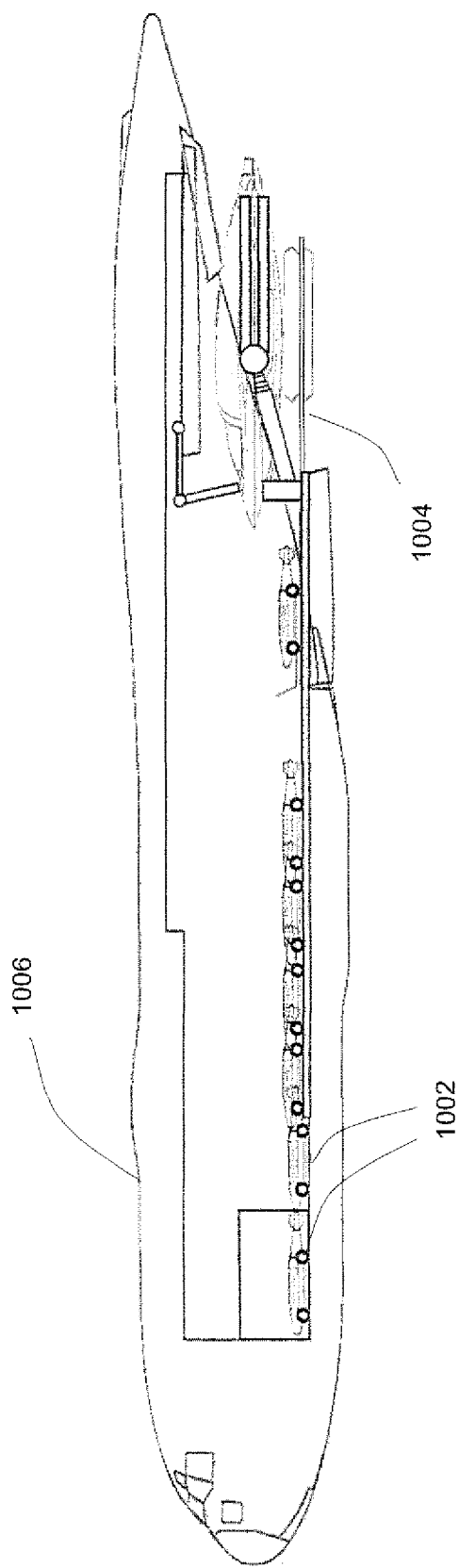
FIG. 10A shows a side view of an ordnance arrangement in a servicing aircraft for rearming the captured UAV according to an example embodiment.
Figure 10B:
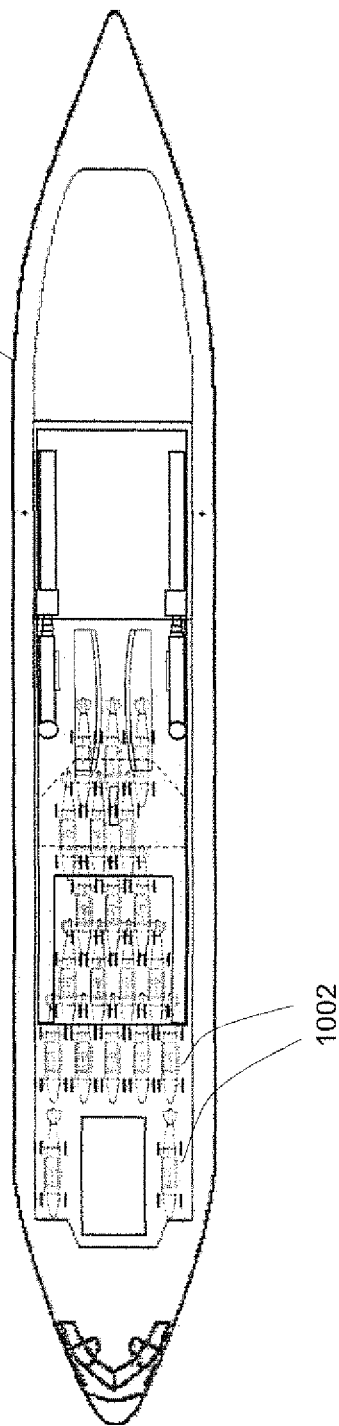
FIG. 10B shows a plan view of the ordnance arrangement of FIG. 10A.

FIG. 10A shows a side view of an ordnance arrangement in a servicing aircraft for rearming the captured UAV according to an example embodiment and FIG. 10B shows a plan view of the ordnance arrangement of FIG. 10A. As some of the carts 1002 are parked on the movable servicing platform 1004, when the platform 1004 moves aft to its deployed position, these carts 1002 would move aft with it as well, contributing to the shift aft in the aircraft's 1006 centre-of-gravity (CG). To minimise this CG shift, the last two rows of ordnance carts 1002 may be "chained" together by two hold-back cables each, which runs through the chassis of each cart, and may be secured on either side to the base plate's side rails. When the servicing platform 1004 is ready to be shifted aft, the load crew commands brakes off on the last two rows of carts 1002, and when the deck shifts aft, the chains hold the last two rows in a fixed position relative to the aircraft 1006, while the deck slides aft underneath their wheels. When the cables are no longer needed, they may be removed as they would pose an impediment to personnel movement.

The ordnance load is arranged in rows in the transport's cargo hold. Each bomb is transported on its own loading cart, for ease of loading onto the transport, and loading onto the UAV. Some carts are parked directly onto the transport's cargo hold floor; some carts are placed on the fixed base plate, while others are placed on the movable servicing platform. This arrangement shows a load of twenty 2,000-lbs class GBU-31 joint direct attack munition (JDAM) GPS-guided bombs, sufficient to rearm 10 UAVs. If a smaller weapon such as the 1,000-lbs class GBU-32 JDAM were used, forty weapons can be carried. Alternatively, a mix of 1,000 and 2,000 lbs munitions may be carried, according to UAV mission requirements.

Since the UAV can now be refuelled and rearmed in flight, its operational limitations (range/payload) have essentially been "deferred" to the servicing aircraft. As the C-17 itself can be air-refuelled and can carry relief crews on board for extended duration missions, the ultimate limitation for this concept is the servicing aircraft's available ordnance load to rearm UAVs. In these circumstances, it may be desirable to increase the number of munitions in order to be able to rearm more UAVs.

FIG. 11A shows the plan view of the ordnance arrangement in a servicing aircraft for rearming the captured UAV according to an alternate embodiment. FIG. 11B shows a front view taken along the longitudinal direction of the servicing aircraft of the ordnance arrangement of FIG. 11A. If a larger munitions load is desired, this can be achieved in this embodiment by dispensing with the ordnance transport/loading carts for the munitions stored on the cargo floor and base plate, as shown in FIG. 11A, leaving only those on the servicing platform to require transport/loading carts: these carts need to be mobile when the servicing platform moves aft. The space freed up by the transport/loading carts can then be used to pack in a larger number of munitions, in a double-level arrangement, as shown in FIG. 11B. The lower row of bombs would be held in simple cradles placed directly on the cargo hold floor/base plate, and strapped down. Spacers/cradles are then placed on these lower bombs, and the upper row of bombs loaded. A mobile bomb hoist is used in conjunction with the transport/loading cart. This hoist can be based on existing designs, with a hand or motor-powered crank and a swiveling boom mounted on a stable base. At the rear stack of bombs, the ordnance load crew hoists each bomb onto the cart for transfer to the UAV; this is repeated until the upper row is expended; the spacers/cradles are then removed to access the lower row of bombs. When this is expended, the lower cradles are removed to provide access to the forward stack of bombs.

With this arrangement, the load of GBU-31s can be increased by 50% to a total of 30; with GBU-32s the number would be even greater, and a 3-level stack may be possible as well. However these configurations require verification that it will not cause the aircraft's centre of gravity to exceed limits, while the concentrated weight of the stacked bombs do not exceed the localised cargo floor spot loading limits. It also minimises the "shuffling" procedure that is necessary when each item of ordnance is stored on its own cart: as each cart is loaded, the now-empty carts must be positioned and repositioned in a complex sequence to allow the still-loaded carts in front the space to be maneuvered to the rear and brought to the servicing platform.

Figure 12B:
FIG. 12B shows a cross sectional view of the track of FIG. 12A disposed in a servicing aircraft.
Figure 12C:
FIG. 12C shows a plan view of the track of FIG. 12A disposed in a servicing aircraft.
Figure 12A:
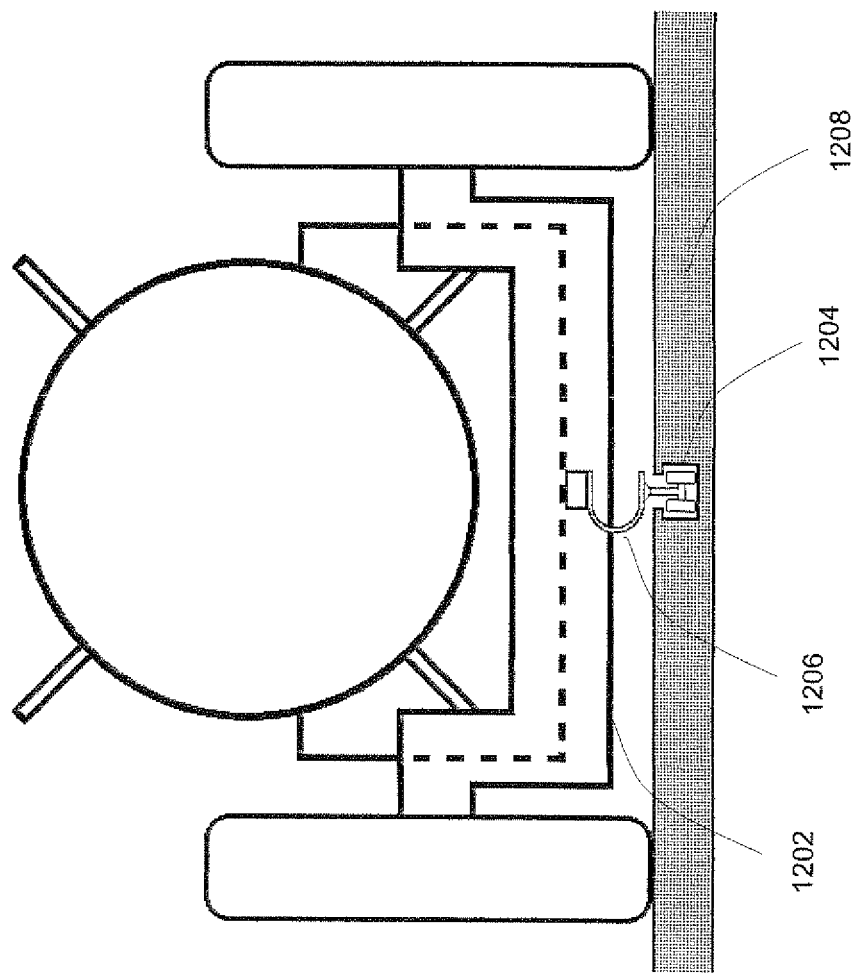
FIG. 12A shows a front view of an ordnance cart and a track disposed on the servicing platform and configured to engage the vertical restraint mechanism of the ordnance cart while permitting horizontal movement.
Figure 13:
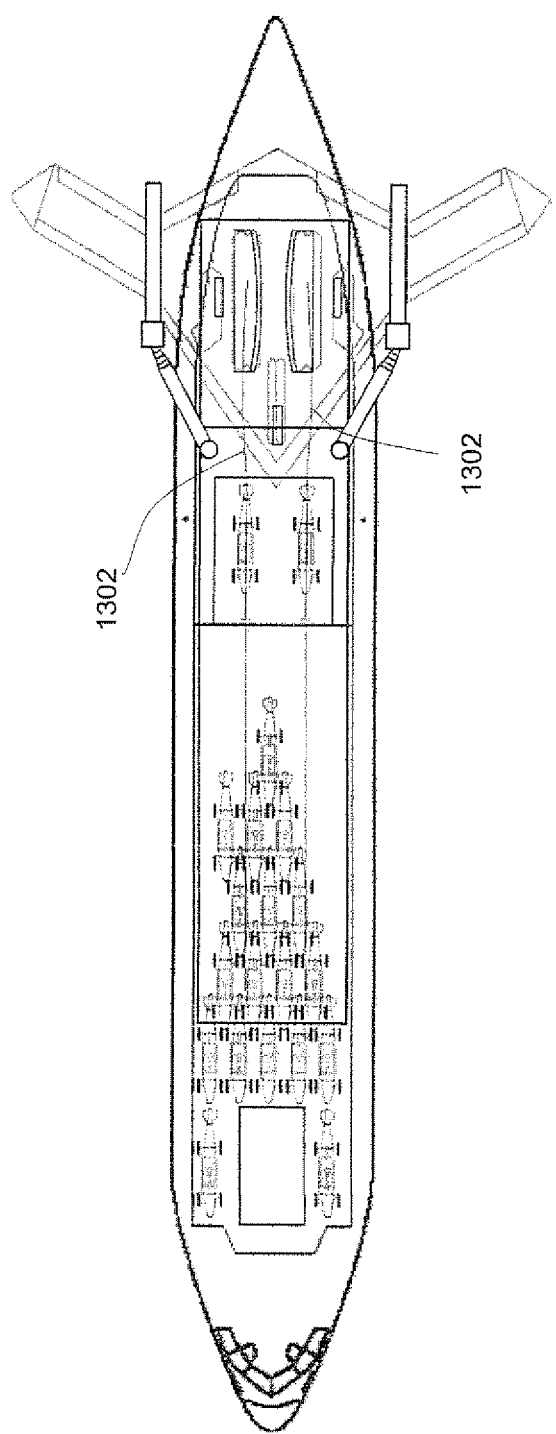
FIG. 13 shows a plan view of the arrangement of the tracks of FIG. 12A to be engaged by the ordnance transport/loading carts, and facilitating their alignment with the UAV's weapon bays.

FIG. 12A shows a front view of an ordnance cart 1202 and cross-sectional view of a track 1204 disposed on a servicing platform 1208 and configured to engage the vertical restraint mechanism 1206 of the ordnance cart 1202 while permitting horizontal movement. FIG. 13 shows a plan view of the arrangement of the tracks of FIG. 12A to be engaged by the ordnance transport/loading carts, and facilitating their alignment with the UAV's weapon bays. When the cart's tie downs are removed to enable it be moved, it is at risk of being lifted off the deck in the event of turbulence. To prevent this, a vertical restraint device 1206 that does not restrict horizontal movement may be used. This may be a simple C-spring-loaded roller attached to the bottom of the cart 1202 chassis. The roller engages a groove track 1204 in the base plate and servicing platform's 1208 surface, which runs all the way up to and extends onto the swivel doors, to provide vertical restraint for the cart 1202. These grooves may be flush with the plate/platform surfaces to minimise obstruction to personnel and equipment movement. With multiple rows of ordnance carts at the storage area, it would be impractical to have multiple rows of tracks converging into two at the swivel doors. To avert this, two long tracks 1302 are provided, with their start points towards the front of the base plate as shown in FIG. 13. To avoid having to move carts aft of the track 1302 start points forward to engage the start points (which would also be blocked by other carts), multiple track "entry points" are provided along its length. These are places where the groove opening at the surface is widened with a ramp to allow the roller device to enter the track, and these entry points would be indicated by markings on the base plate. As the load crew lines up the cart with the track, the roller automatically runs into the entry point ramp due to the spring force and engages the track. Besides vertical restraint, the track also helps to align the carts correctly with the UAV's weapon bays: due to the contour of the weapon bays doors, the carts cannot approach "straight in", but must follow a curved path, and the track path may be used to facilitate this. The rationale of assigning an individual transport/loading cart to each item (or pair) of ordnance is for expediency in the movement and loading of ordnance on the UAV. FIG. 12B shows the cross sectional view of the track and FIG. 12C shows the plan view of the track in an example embodiment.

The ordnance loading procedure described above is largely manual; however, it may be possible to automate the process to a significant extent, e.g. remotely-controlled self-powered loading carts moving into position under the UAV; adjusting the bomb cradle to align the bomb suspension lugs with the bomb rack hooks; opening and closing the rack hooks to engage the suspension lugs; and lowering the cradle and returning the cart to the base plate. This would reduce the exposure and risk to the ordnance load crew. However, the final series of tasks—checking the correctness/security of the loading, and connecting the electrical umbilical from the bomb rack to the bomb's connector, still needs to be done manually due to the need for human judgment and dexterity.

Figure 14:
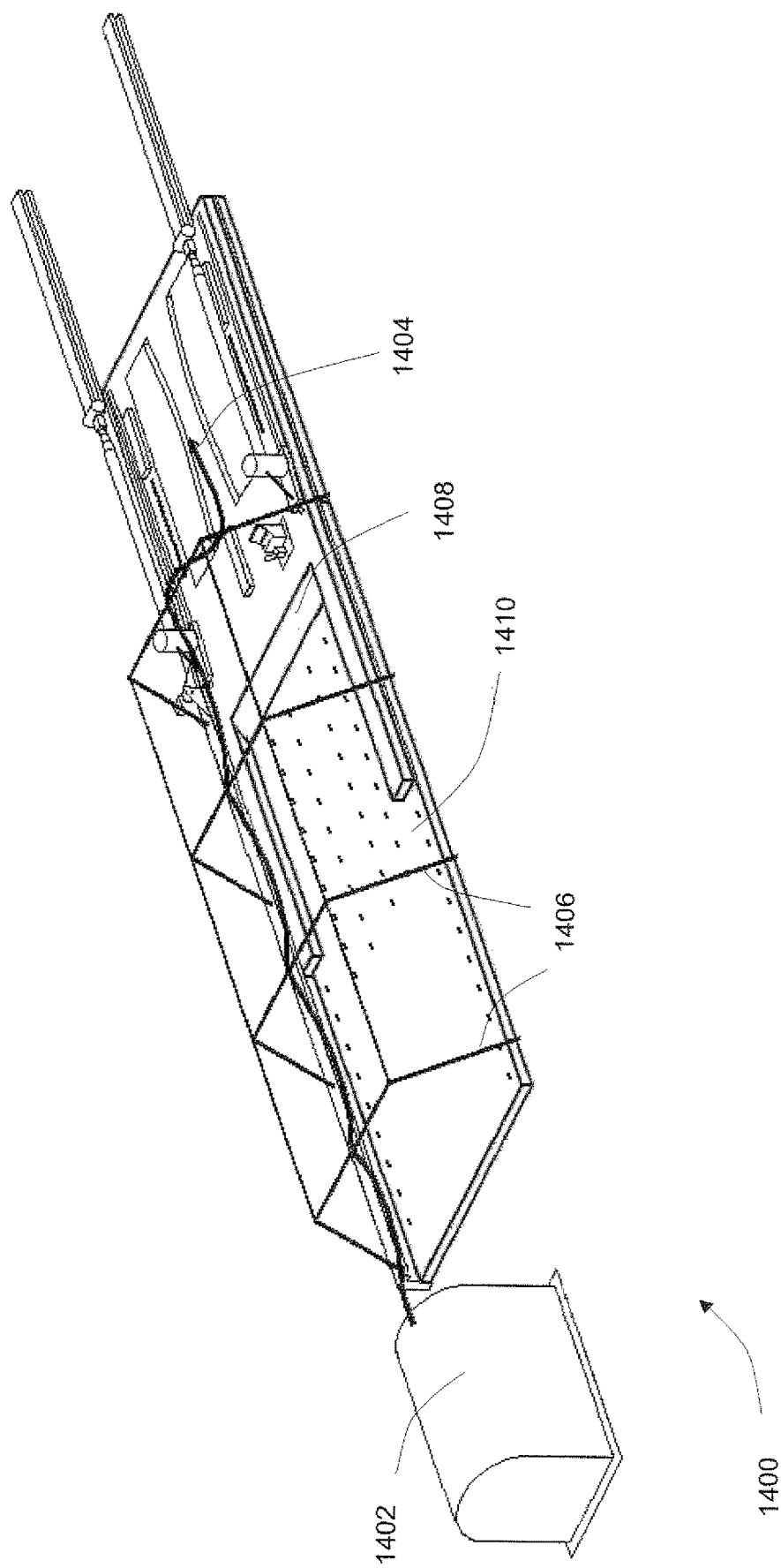
FIG. 14 shows a schematic diagram illustrating a perspective view of a refuelling apparatus for refuelling a captured UAV onboard a servicing aircraft according to an example embodiment.

FIG. 14 shows a schematic diagram illustrating a perspective view of a refuelling apparatus 1400 for refuelling a captured UAV according to an example embodiment. The refuelling apparatus 1400 includes a pallet fuel tank 1402 attached to the servicing aircraft and connected to a fuel supply of the servicing aircraft and a hose 1404 connected to the pallet fuel tank 1402 and suspended on a supporting frame 1406. The pallet fuel tank 1402 is similar to the fuel tanks used on transport aircraft converted to serve as aerial refuelling tankers, e.g. the KC-130. The pallet fuel tank 1402 may be mounted on a pallet for easy loading/unloading from the servicing aircraft's cargo hold, and is the first item loaded into/last item unloaded from the servicing aircraft. It receives its fuel supply from the servicing aircraft's own internal wing tanks, via plumbing that connects the wing tanks to the pallet tank 1402. The pallet tank 1402 has pumps to deliver its fuel via the refuelling hose 1404 to the UAVs. The capacity of the pallet tank 1402 may be sized as needed, and is mainly driven by the amount of fuel needed to manage the servicing aircraft's centre of gravity (CG). In an example implementation, the tank is sized at 4,000 US gallons/15,142 liters.

The pallet fuel tank 1402 serves two main purposes: (i) to provide a ready source of fuel to refuel the UAVs that are captured and retrieved on board and (ii) assist in regulating the CG of the servicing aircraft, as the servicing platform is shifted aft, the ordnance transport/loading carts moved aft and the UAV is brought aboard. The CG is regulated, for example, by varying the amount of fuel stored in the pallet tank 1402.

The fuel hose 1404 has at its end a standard nozzle to engage the UAV's ground refuelling adapter. The hose 1404 must be routed from the pallet fuel tank 1402 to the servicing platform 1408, with sufficient slack to account for the servicing platform's 1408 translation. It may be possible to rout the hose 1404 along the cargo hold floor and base 1410 to the servicing platform 1408. However, the presence of the hose 1404 on the floor may potentially be detrimental to the smooth and efficient movement of personnel and equipment, e.g. posing a tripping hazard to personnel and obstruction to movement of ordnance carts. In a preferred embodiment, the hose 1404 is suspended above the floor by a supporting frame 1406. These frames 1406 are located at regular intervals along the cargo hold, and would slot into fittings located on both sides of the cargo hold floor and side guide rails.

Figure 15:
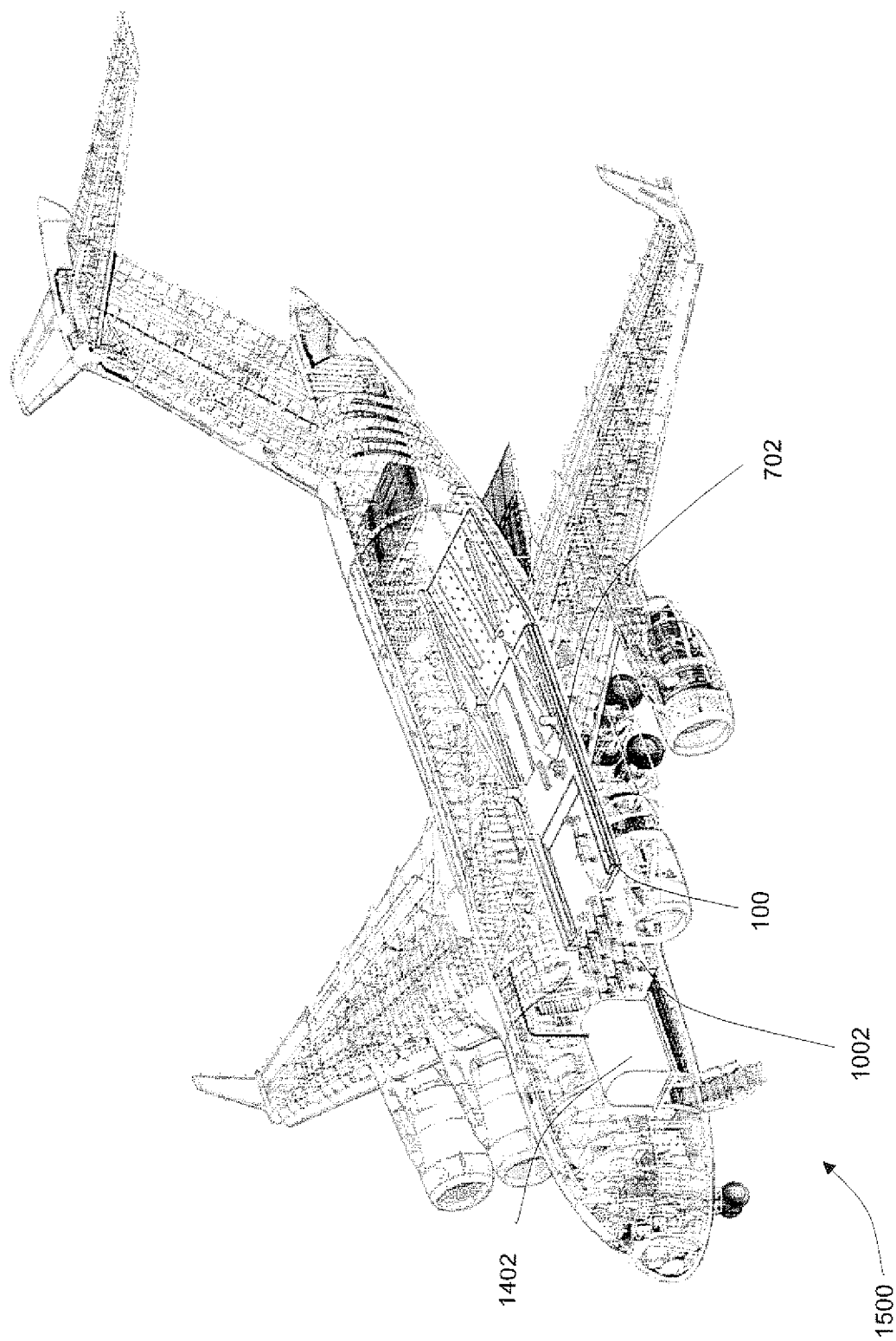
FIG. 15 shows a perspective view of a servicing aircraft having the apparatus of FIG. 1A disposed therein according to an example embodiment.
Figure 16:
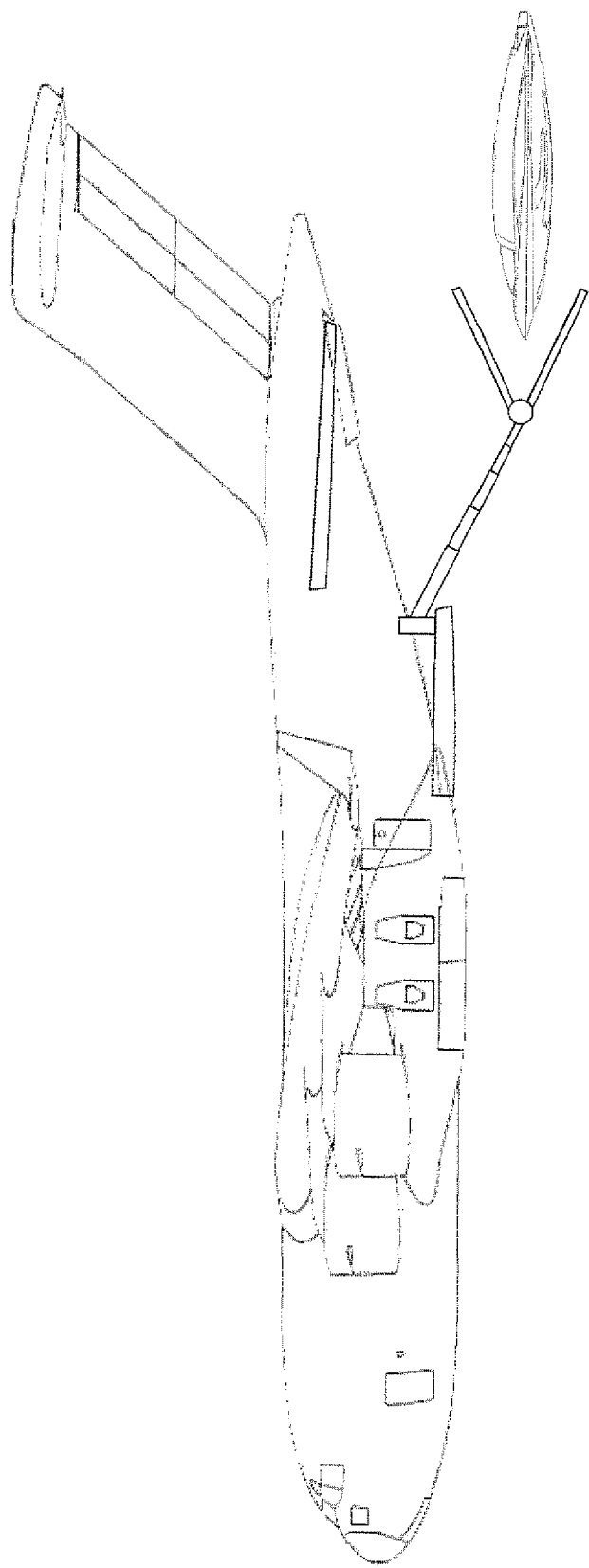
FIG. 16 shows a side view illustrating the aerial recovery of the UAV using the apparatus of FIG. 1A disposed in the servicing aircraft during a recovery operation.
Figure 17:
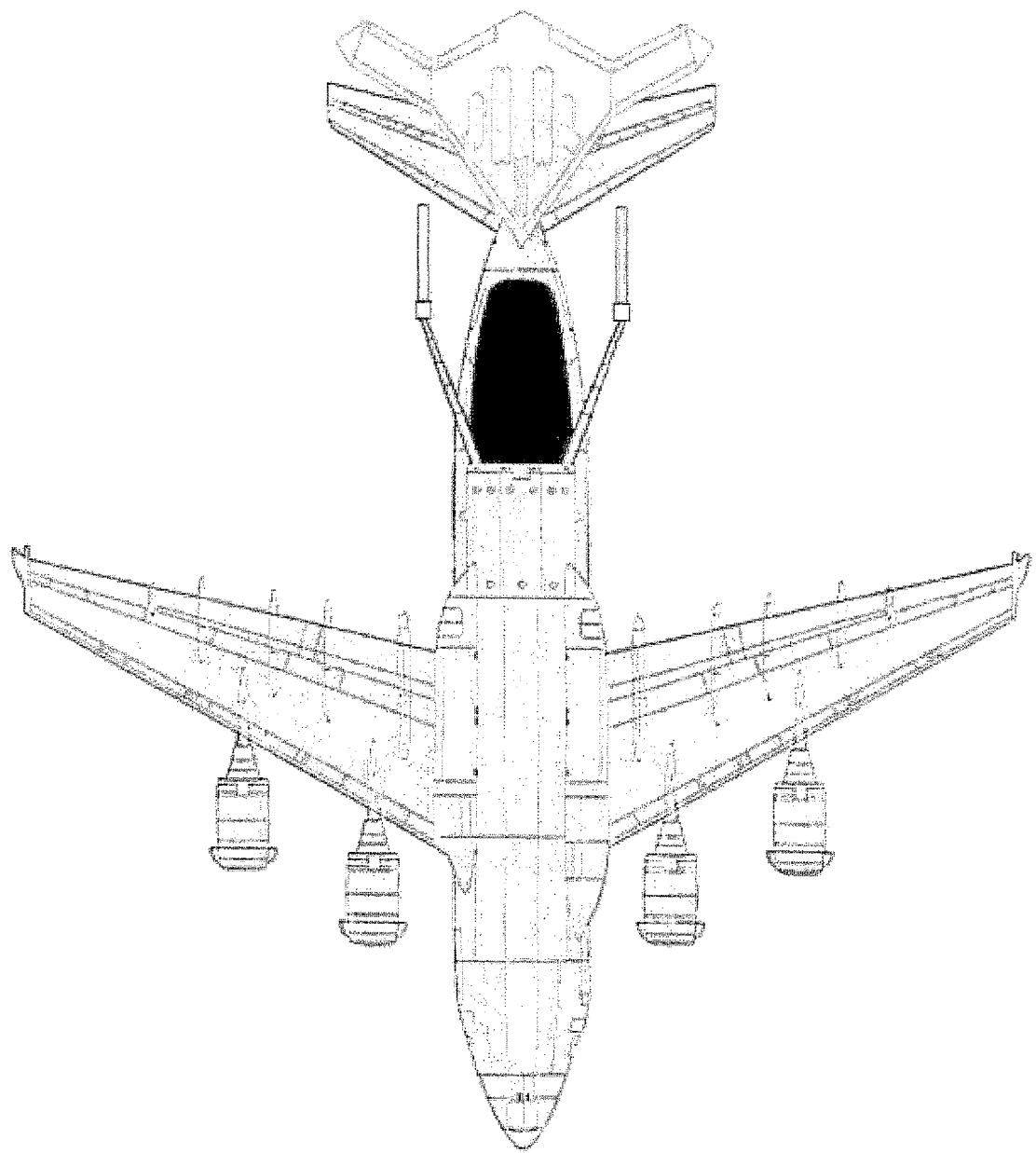
FIG. 17 shows a bottom view illustrating the aerial recovery of the UAV using the apparatus of FIG. 1A disposed in the servicing aircraft during a recovery operation.

FIG. 15 shows a perspective view of a servicing aircraft 1500 having the apparatus 100 of FIG. 1A disposed therein according to an example embodiment. Also shown in FIG. 15 is a control station 702 (FIG. 7A) disposed in the servicing aircraft 1500, the control station 702 being in communication with the apparatus 100 and configured to operate the apparatus 100. Further, the positions of the pallet fuel tank 1402 (FIG. 14) and ordnance carts 1002 (FIG. 10A) are also shown. FIG. 16 shows a side view illustrating the aerial recovery of the UAV using the apparatus of FIG. 1A disposed in the servicing aircraft during a recovery operation. FIG. 17 shows a bottom view illustrating the aerial recovery of the UAV using the apparatus of FIG. 1A disposed in the servicing aircraft during a recovery operation.

After the UAV flies to the rendezvous point with the servicing aircraft, it needs to fly into formation with the servicing aircraft, and then into the capture envelope of the telescopic arms. The capture may be performed either fully autonomously or at least semi-autonomously.

UAVs such as the X-47 have already demonstrated their ability to autonomously aerial refuel from a tanker, which requires a high level of precision in control and formation-keeping. In the example embodiments, this capability can be used to fly the UAV to the capture envelope of the telescopic arms for capture. As the UAV approaches the capture envelope, its flight control system (FCS) communicates with the computer in the operator control station, receiving relative distance and rate of closure data from the range finder via the datalink, which provides fine steering guidance to place it optimally in the capture box. The capture controller in the recovery crew commands the capture forks to open, the UAV flies forward into the forks' envelope; the telescopic arms perform a lateral positioning adjustment to place the left and right forks in the optimum capture position. When this position is achieved, confirmed by the range finder in the control station, it is displayed to the capture controller who commands the forks to close and secure the capture. Alternatively, this process may be automated and performed solely by the control station computer. After capture, a signal is sent to the UAV to set its FCS to a passive or standby mode, and its engine power level to idle, to prepare for it to be reeled on board.

The semi-autonomous method likewise involves the UAV flying autonomously into the proximity of the capture envelope, after which the capture controller onboard the servicing aircraft activates the semi-autonomous mode. A signal is sent to the UAV FCS to hand over its control authority to the computer in the operator control station; using data from the range finders, this computer then commands the UAV FCS to fly the UAV into the capture envelope endgame.

A third method may be implemented if deemed necessary for operational or other reasons. This manual mode uses the same elements as the semi-autonomous method, but instead of the computer in the operator control station taking over the UAV FCS authority, the capture controller directly controls the FCS. This can be accomplished through basic flight controls on the control station (such as a joystick) that enable the controller to command the trajectory of the UAV left/right, up/down and forward/aft, through throttle or speed brake control. In this embodiment, the control station display system typically needs to provide steering cues to guide the controller to fly the UAV into the optimum capture envelope.

After capture, the controller can manually or automatically command the telescopic arms to reel in the UAV. This involves simultaneously retracting the telescopic arms telescopically; rotating the telescopic arms outwards; and pivoting the telescopic arms up in pitch. Concurrently, the actuators controlling the telescopic arm end effectors operate in conjunction to keep the forks and UAV aligned with the longitudinal and horizontal axes of the servicing aircraft. If manually performed, the control station computer still exercises "envelope protection," to prevent the controller from over-rotating the telescopic arms in pitch for example, which would cause the UAV to strike the upper cargo door.

As the UAV is drawn into the cargo hold opening, a final position/alignment check is performed to ensure the UAV is correctly placed above the trestle supports and platform swivel doors, before it is lowered onto the supports.

Once captured and rigidly connected to the servicing aircraft, the UAV affects the servicing aircraft in two ways: aerodynamics and CG. The servicing aircraft FCS needs to be able to compensate for the effects of the two aircraft joined in flight.

When the UAV is secured in the servicing aircraft's cargo hold, its wings still extend outside into the airflow, and act like additional lifting surfaces, or a second horizontal stabiliser. This additional lift may be compensated for by the servicing aircraft's flight crew by trimming the horizontal stabiliser, or the servicing aircraft's fly-by-wire FCS may be able to perform this automatically, if it has been deliberately programmed to handle this mission and configuration.

Besides the weight of the UAV on board, the servicing aircraft has to contend with the weight of the servicing platform moving aft, and the weight of the ordnance carts being shifted. The CG shifts from these events may be compensated for by the servicing aircraft's flight crew manually controlling fuel transfer to the pallet fuel tank as ballast; or handled automatically by the servicing aircraft's flight management system and FCS, once it has been programmed for this mission and configuration.

For example, the Boeing C-17 Globemaster III transport aircraft which has been referenced as the basis for the servicing aircraft is also designed to air-drop heavy cargo pallets in flight, and its fly-by-wire electronic FCS is therefore able to deal with large changes of weight and CG shifts in flight.

A mission monitoring system may be present and may display to the mission commander or flight crew the status of the mission: the number, identity and locations of UAVs to service; rendezvous times; fuel/serviceability states of the UAVs (e.g. onboard LRU failure, prompting the servicing crew in advance); imagery from the operator control station and other data such as tanker rendezvous to replenish the servicing aircraft's own fuel supply. The mission monitoring system need not be a physically separate system, but could be a function embedded in the aircraft's basic mission computer, and displayed on its cockpit flight management system displays. The data to be fed into the mission monitoring system may be exchanged among the servicing aircraft, UAVs and tankers via existing datalink systems such as the Link 16 network.

During operation, there are circumstances where the UAV cannot be refuelled onboard the servicing aircraft concurrent with the rearming operation. One such scenario is when there is atmospheric turbulence in the servicing aircraft/UAV rendezvous area severe enough to prevent safe formation flight for UAV recovery. If the servicing aircraft and UAV cannot fly to calmer air in time due to the expanse of the turbulent air or the UAV's fuel state (no dedicated tanker aircraft is assumed to be nearby, as the servicing aircraft is expected to handle the refuelling operation), the UAV may be lost to fuel starvation. Another scenario is this: early in a multiple UAV servicing mission, an emergency occurs which requires jettisoning of the forks, rendering the servicing aircraft incapable of recovering onboard any more UAVs; the remaining UAVs would then be lost to fuel starvation.

To preclude this from happening, the servicing aircraft may be equipped with a contingency conventional hose/drogue refuelling system to complement the primary (ground style) onboard refuelling system. FIGS. 18A-B show an interchangeable refuelling apparatus capable of either refuelling a captured UAV on-board the servicing aircraft (FIG. 18A) or contingency refuelling an off-board UAV flying in formation with the servicing aircraft (FIG. 18B). This system may utilise the same ground refuelling hose and suspension frames described above but the hose would terminate at a quick disconnect coupling end as shown in FIG. 18A. This coupling is of the type that incorporates shut-off valves/O-rings that enable connects/disconnects to be made even when the hose is filled with fuel. In normal (UAV onboard) refuelling, the other end of the coupling connects to a hose with a standard fuel nozzle 1802. In this contingency system, the coupling alternatively connects to a hose which has a refuelling drogue "basket" 1804 at its end as shown in FIG. 18B. This hose is routed through a reel drum-like mechanism 1806 similar to that utilised on dedicated tanker aircraft, to deploy and retract the drogue. The drum mechanism needs to be re-locatable on the servicing platform: placed at the ramp opening to deploy the hose/drogue for refuelling, and stowed to clear the opening for UAV recovery operations, and is therefore pallet-mounted. As the hose needs to be reeled out into the air, it is considerably longer than the hose needed for normal refuelling, but space and weight constraints mean that the longer section of hose cannot be stored in the reel drum mechanism 1806 (it must be moved manually), as is the case with tankers. The longer length of hose may be accommodated by having slack in the hose where it is suspended between the frames; this slack is taken up when the reel drum 1806 deploys the hose. However, when the reel drum 1806 retracts the hose, the slack will not re-form automatically; the hose will instead "bunch up" behind the reel drum 1806. To prevent this from happening, the slack must be induced and this can be performed manually or automatically.

In the manual method, ropes or cables 1808 are run over the hose, between the suspension frames where the slack would be. When the reel drum 1086 starts to retract the hose, personnel manning both ends of the cables simply start pulling down on them to form the slack, coordinating their efforts to form slacks in the correct sequence. The automatic method replaces the personnel with motorised or powered pulleys 1810 on the suspension frames. These are controlled by a computer in the operator control station, which operates each pulley 1810 sequentially to feed the hose when the drum 1806 reels it out for deployment, and in the reverse direction and sequence to reform the slack when the reel drum 1806 starts to retract the fuel hose.

During aerial refuelling operations, the reel drum 1806 pays out the hose/drogue into the air a safe distance behind/below the servicing aircraft, where the UAV can attempt probe/drogue refuelling. This would provide the UAV with sufficient fuel to keep flying until the turbulence abates or both aircraft can fly to calmer air for the capture/retrieval operation to take place, or in the emergency release scenario, enough fuel for the UAVs to return to base, or at least reach tanker aircraft. Operation of the hose drum reel and fuel flow are controlled from the operator control station, but movement of the reel drum mechanism pallet and connecting/disconnecting the hose coupling is performed manually by the servicing crew.

A normal C-17 crew consists of two pilots and a loadmaster. Due to the long mission durations possible with this concept, a relief flight crew would be needed, for a total of 4 pilots. The mission crew may consist of a mission commander; 1-2 capture controllers; 2 refuelling crew and 4 ordnance load crew. If maintenance of UAV systems is required, an avionics/systems specialist may be included. Some cross-tasking of the crews may take place to optimise operations, e.g. the avionics, refuelling and capture controller crews helping to move the ordnance carts when not engaged in their primary duties. The total mission crew size would therefore range from 12-14 personnel, although this number should be considered provisional. If the ordnance loading operation can be automated, it would be feasible to reduce the ordnance load crew from 4 to 2.

A safety system may be present to deal with various emergency situations that may arise during the capture/reel in process of the UAV, e.g. the UAV developing a serious fuel leak or catching fire. In this situation, the UAV needs to be released or jettisoned, lest the fire results in an explosion that threatens the safety of the servicing aircraft and its crew.

If a fire breaks out in the UAV during the capture/reel in process, the servicing aircraft recovery crew essentially has two options: open the forks and release the UAV, or jettison the UAV, while still enveloped in the forks. Which action to take depends on the stage of the capture operation where the fire occurs, the aerodynamic characteristics (pitch stability) and condition of the UAV.

If the fire breaks out early prior to the UAV putting its FCS into standby mode, the recovery crew can simply release the UAV, and activate the emergency command on the control station. This would send a signal to the UAV's FCS, commanding it to pitch down and away from the servicing aircraft.

If the fire breaks out after the UAV has placed its FCS into standby mode, the recovery crew must assess the situation quickly based on the following factors, to determine their course of action: (i) can the FCS be reactivated immediately? If yes, the UAV may be released under positive control and (ii) If the FCS cannot be reactivated due to systems damage, and depending on the natural aerodynamic pitch stability of the UAV and prevailing circumstances, i.e. the severity and rate at which the fire is spreading, the crew have two options: (1) Controlled release: if time permits (the fire does not appear to be leading to an imminent danger of explosion), the crew can extend the telescopic arms out and just release the UAV if it is aerodynamically stable in pitch; however vehicles of the X-47's configuration are most likely to be unstable in pitch; accordingly the crew must first pivot the telescopic arms down and forks up to hold the UAV at a negative angle of attack to the airflow, so that when the forks open to release the UAV, the aerodynamic drag acting on it will cause it to pitch down and safely away from the servicing aircraft. (2) Emergency release: if the fire is such that the UAV appears to be on the verge of exploding, the crew must quickly activate the jettison system, to sever the forks while they are still enveloping the UAV.

Such a drastic action is intended as a last resort, but necessary particularly with a pitch-unstable UAV. To release an unstable UAV "clean" without its FCS operational and exerting positive control would be highly dangerous, as the UAV could pitch up and strike the servicing aircraft. When the UAV is released "dirty" with the forks still attached, the weight and drag of the forks would cause the UAV to safely pitch downwards and fall cleanly away from the servicing aircraft.

Figures 19A, 19B:
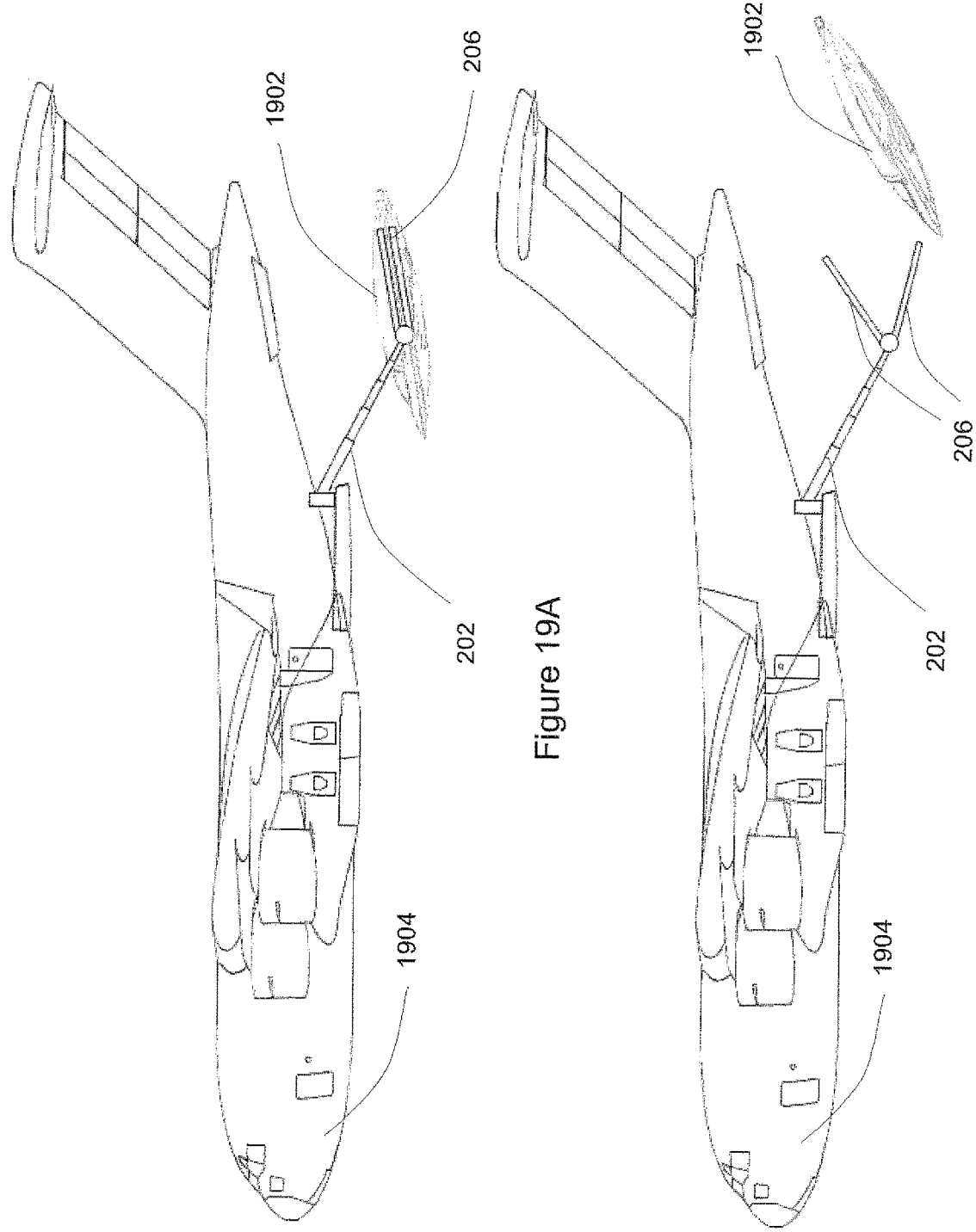
FIG. 19A shows a side view illustrating a controlled (non-emergency) release of a UAV with an inoperative flight control system according to an example embodiment.
FIG. 19B shows a side view illustrating the controlled release of said inoperative flight control system UAV with a negative angle-of-attack, to prevent it pitching upwards and striking a servicing aircraft according to an example embodiment.

FIG. 19A shows a side view illustrating the preparation for a controlled release of an aerodynamically unstable UAV 1902 with its FCS inoperable according to an example embodiment and FIG. 19B shows a side view illustrating the release of said FCS inoperable UAV 1902 according to an example embodiment. In a controlled release operation, the crew may extend the telescopic arms 202 (FIG. 2A) rearward and downward relative to the servicing aircraft 1904 and just release the UAV 1902 if it is aerodynamically stable in pitch. In another example embodiment, the UAV 1902 may be unstable in pitch. Accordingly, as shown in FIGS. 19A and 19B, the crew pivots the telescopic arms 202 down and tilt the capture forks 206 (FIG. 2A) up to hold the UAV 1902 at a negative angle of attack to the airflow, so that when the capture forks 206 open to release the UAV 1902, the aerodynamic drag acting on it will cause it to pitch down and safely away from the servicing aircraft 1904 (see FIG. 19B).

Figure 20:
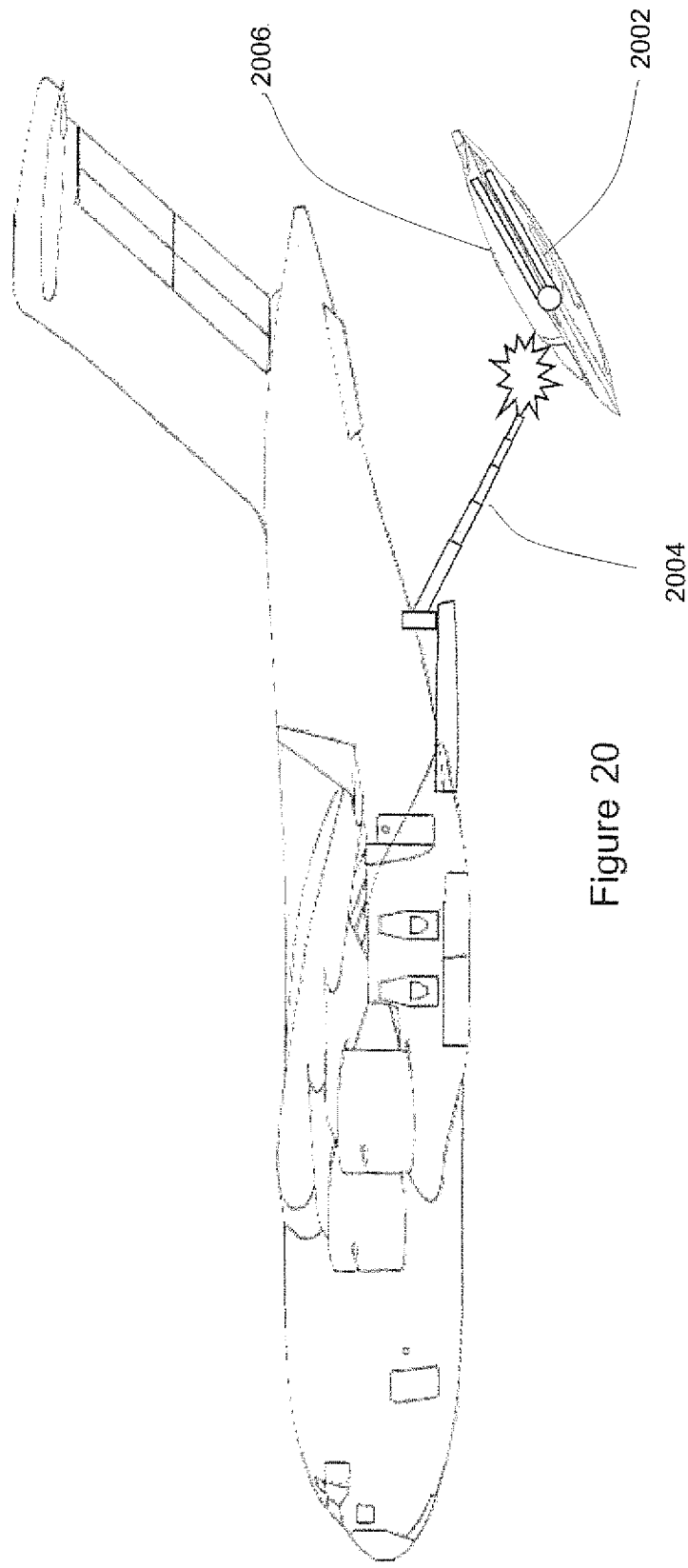
FIG. 20 shows a side view illustrating the release of said inoperative flight control system UAV during an emergency operation.

FIG. 20 shows a side view illustrating the emergency release of an aerodynamically unstable UAV with its FCS inoperable. In this Figure, the capturing mechanism may further comprise a jettison system configured to dismount the respective capture forks 2002 from the two telescopic arms 2004 during an emergency operation. The fork jettison system may be incorporated at an interface between the swivel joint and the telescopic arms 2004. It may comprise of explosive bolts or pyrotechnic fasteners at the swivel joint hinges and pitch actuators. When activated in emergency situations, these bolts sever and allow the entire capture fork 2002 to fall away while still enveloping the UAV 2006.

If the fire breaks out at a late stage in the recovery process, it would not be possible to jettison the UAV immediately and safely, as the UAV may be so close as to hit the cargo hold structure or ramp door. In this situation, the safety system first stops the telescopic retraction, reverses and extends it outwards until the UAV is at a safe jettison distance, for the recovery crew to perform a controlled or emergency release.

The last scenario has the fire breaking out after the UAV has been recovered aboard the servicing aircraft, and is being serviced. With its weapons bay doors open and blocked by the swivel doors, there would not be enough time to retract everything, deploy and jettison the UAV. In this situation the emergency measures are conventional: the servicing crew would have to fight the fire with on board hand-held gaseous fire extinguishers. Assuming the fire has been put out; the recovery crew must then dispose of the "dead" UAV. Without the element of time urgency, the recovery crew can perform a controlled release and not resort to jettisoning the forks, preserving them and allowing the servicing aircraft to continue with its mission.

The safety system jettison controls are activated from the operator control station. When initiated, explosive bolts at the telescope/fork swivel joint would fire and sever the connection, allowing the forks and UAV to fall away. Although this action would terminate the servicing aircraft's mission, as it can no longer service other UAVs, it is infinitely preferable to the alternative of losing of the servicing aircraft and crew.

Figure 21:
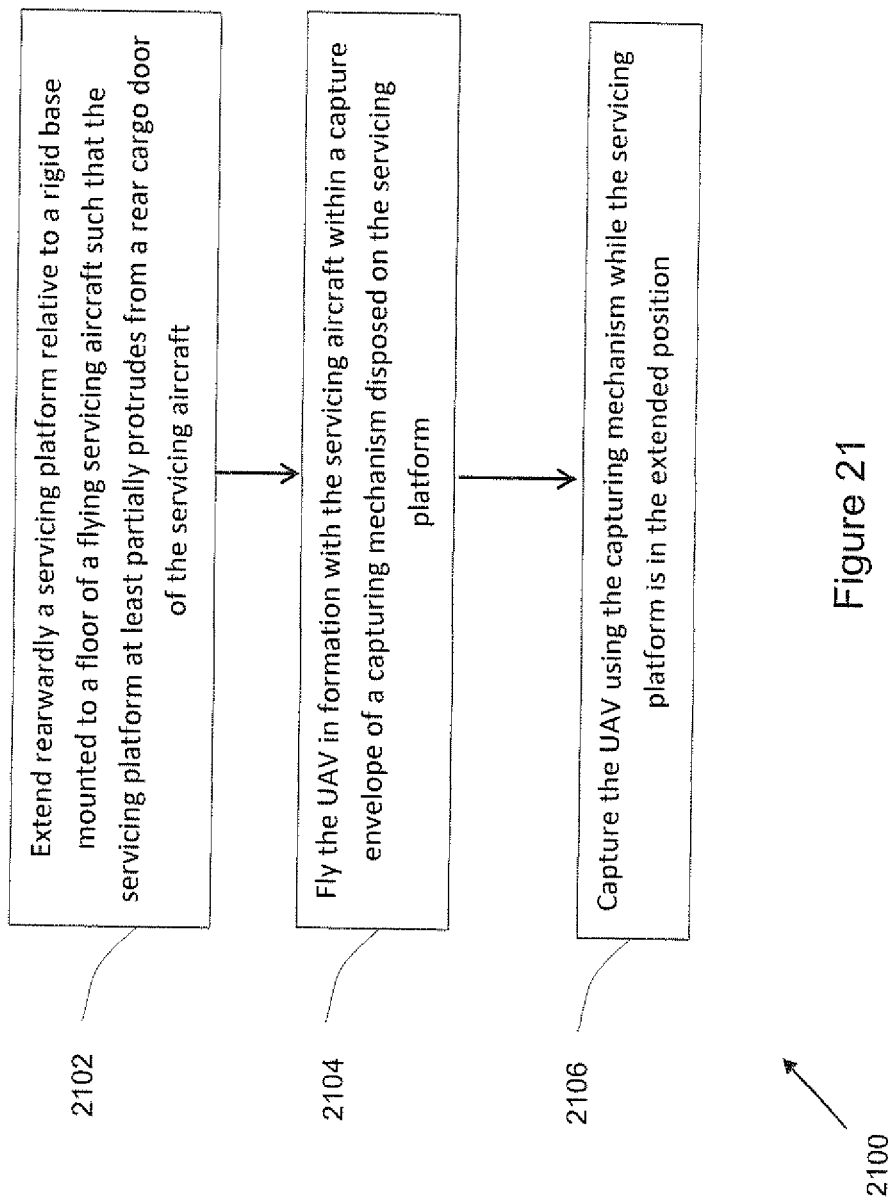
FIG. 21 shows a flow chart illustrating a method for aerial recovery of a UAV on an in-flight aircraft according to an example embodiment.

FIG. 21 shows a flow chart 2100 illustrating a method for aerial recovery of a UAV on an in-flight aircraft according to an example embodiment. At step 2102, a servicing platform is extended rearwardly relative to a rigid base mounted to a floor of a flying servicing aircraft such that the servicing platform at least partially protrudes from a rear cargo door of the aircraft servicing. At step 2104, the UAV is flown in formation with the servicing aircraft within a capture envelope of a capturing mechanism disposed on the servicing platform. At step 2106, the UAV is captured using the capturing mechanism while the servicing platform is in the extended position.

In another example, the method may comprise: (1) The servicing aircraft rendezvous with the UAV. Whether the former flies to the latter's operating area or vice versa is for the operators to decide, and may be determined by factors such as the presence of hostile air defences and threats to the servicing aircraft. (2) The servicing aircraft opens its cargo doors and deploys the servicing platform and capture telescopic arms. (3) The UAV flies into pre-capture formation with the servicing aircraft. (4) After receiving clearance from the mission commander to proceed with the UAV capture, the capture controller selects autonomous or semi-autonomous capture mode. (5) The UAV flies into the capture envelope, performs fine position adjustment to line up with the capture forks, and the forks close around it. (6) The UAV's FCS is set to the standby mode and its engine into flight idle thrust. (7) The telescopic arms start to retract telescopically, rotate inwards and pitch upwards to bring the UAV to the cargo hold level. (8) The servicing platform deploys aft-wards, while the telescopic arm assemblies move forward on their tracks to remain in the same relative position. (9) When the telescopic arms bring the UAV to the correct position, the support trestles on the servicing platform extend, along with the safety rails. (10) The telescopic arms lower the UAV onto the trestles, "press" it downwards and lock in rotation; at the same time the hold down/restraint system deploys. (11) The servicing platform swivel doors operate; the UAV's weapons bay doors open and the swivel doors return to the flush position. (12) The servicing crew approaches the UAV: they electrically ground it to the servicing aircraft and prepare to service it. (13) The servicing crew releases the ordnance loading carts, roll them to the UAV and upload the bombs onto the bomb racks; other crewmembers bring a fuel hose to the UAV and refuel it using its ground refuelling receptacle; yet other crew troubleshoot any maintenance issues and replace avionics LRUs if necessary. (14) The mission commander and servicing aircraft flight crew monitor the operation and make flight controls/CG trims if necessary. (15) After completing all the servicing tasks, the crew "buttons up" the UAV; the above process is reversed and the UAV re-deployed and released to continue with its mission. (16) The servicing aircraft retracts the telescopic arms and servicing platform, and proceeds to the next rendezvous with other UAVs.

As UAVs are by nature unmanned, they are not subject to the limitations of a human pilot on board; their mission duration is dictated only by the amount of fuel or ordnance remaining on board. The method and system of the example embodiments may enable the UAV to be rearmed and refuelled simultaneously in flight, and even for some minor maintenance to be performed, thus essentially providing unlimited time-on-station for the UAV. Such a system would constitute a "force-multiplier": it would enable a fleet of UAVs to remain on station longer and cover a larger number of targets, which would otherwise require a larger fleet of UAVs, if they had to return to base to rearm, even if they had aerial refuelling capability.

Advantageously, implementing the method and system as described requires minimal or no modification to the UAV, if the aerial recovery requirement is already built into the UAV upfront as part of its specification, e.g. reinforced landing gear doors and wing skins where they contact the support trestles and capture forks respectively. Also, minimal physical modification to the servicing aircraft is required, and is essentially limited to fuel plumbing from the aircraft's wing tanks to the palletised internal fuel tank.

The capture/internal stowage method not only allows simultaneous refuelling/rearming operations (which would have to be performed sequentially as separate operations with an external capture method), but also some maintenance action to be performed, e.g. replacement of faulty line replaceable units (LRUs) on the UAV. The ability to perform maintenance may become a critical capability, as with long-endurance mission UAVs, the probability of component failures increases. This would force the UAV to abort its mission, negating its ability to be refuelled and rearmed in flight. In practical implementations, this maintainability requirement may be incorporated into the UAV, with the systems requiring servicing or components expected to be replaced in flight needing to be located in places on the UAV where they will be accessible by the servicing crew, when it is brought onboard the servicing aircraft.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An apparatus for aerial recovery of an Unmanned Aerial Vehicle (UAV) in mid-flight, the apparatus comprising:
   a rigid base having a first section and a second section pivotably connected to the first section, wherein the first section is securely mounted to a floor of an aircraft and the second section is configured to be locked to the first section when level with the first section; and
   a servicing platform moveably mounted to the base and configured to move along a direction parallel to a longitudinal axis of the aircraft such that in an extended position, the servicing platform at least partially protrudes from a rear cargo door of the aircraft,
   wherein the second section is configured to support the servicing platform in the extended position,
   wherein the servicing platform comprises a capturing mechanism configured to capture the UAV in the extended position and a restraining mechanism configured to secure the UAV on the servicing platform, and
   wherein the capturing mechanism comprises two telescopic arms, each telescopic arm being disposed on a transverse side of the servicing platform and configured to operate in six degrees-of-freedom.

2. The apparatus as claimed in claim 1, wherein the second section further comprises a plurality of support beams configured to extend rearwardly of the aircraft for supporting the servicing platform in the extended position.

3. The apparatus as claimed in claim 1, wherein each telescopic arm comprises a capture fork attached to a distal end of said arm, and wherein the capture fork comprises a pneumatic body configured to securely engage a selected section of the UAV and cushion the selected section to protect the captured UAV.

4. The apparatus as claimed in claim 3, wherein the capturing mechanism further comprises a jettison system disposed at the distal end of each telescopic arm adjacent to the associated capture fork, the jettison system configured to dismount the said capture fork from the telescopic arm in an emergency.

5. The apparatus as claimed in claim 1, further comprising sensing means disposed on the two telescopic arms and configured to communicate with a control station, wherein the sensing means includes at least one of infrared sensors, vision system cameras and/or Lidar.

6. The apparatus as claimed in claim 1, wherein the restraining mechanism is configured to translationally and rotationally secure the captured UAV relative to the servicing platform in the extended position.

7. A system for servicing a UAV in mid-flight, the system comprising:
   a servicing aircraft;
   the apparatus for aerial recovery of a UAV in mid-flight as claimed in claim 1 disposed in the servicing aircraft; and
   a control station disposed in the servicing aircraft, the control station being in communication with the apparatus and configured to operate the apparatus.

8. The system as claimed in claim 7, further comprising refueling means for refueling the captured UAV, wherein the refueling means comprises a pallet fuel tank attached to the servicing aircraft and connected to a fuel supply of the servicing aircraft, and a hose connected to the pallet fuel tank and suspended on a supporting frame.

9. The system as claimed in claim 8, wherein an amount of fuel stored in the pallet fuel tank is controllably variable for regulating a center of gravity of the servicing aircraft.

10. The system as claimed in claim 7, further comprising rearming means for rearming the captured UAV.

11. The system as claimed in claim 7, further comprising a mission monitoring system for monitoring at least one parameter associated with the UAV and/or the servicing aircraft, wherein the control station is movable between a stowed position and an operating position, and wherein the control station maintains a direct line of sight with an approaching UAV at the operating position.

12. The system as claimed claim 7, wherein the control station comprises a display configured to provide real-time positional data of the UAV, and wherein the display is an augmented-reality display configured to provide an indication of a position on the UAV that the capturing mechanism is expected to engage based on the positional data.

13. A method for aerial recovery of a UAV in mid-flight, the method comprising:
   rearwardly extending a servicing platform relative to a rigid base mounted to a floor of a flying servicing aircraft such that the servicing platform at least partially protrudes from a rear cargo door of the servicing aircraft, wherein the base comprises a first section and a second section pivotably connected to the first section and wherein the second section is configured to support the extended servicing platform,
   flying the UAV in formation with the servicing aircraft within a capture envelope of a capturing mechanism disposed on the servicing platform;
   capturing the UAV using the capturing mechanism while the servicing platform is in the extended position; and
   securely supporting the UAV on the servicing platform, wherein capturing the UAV comprises:
      extending two telescopic arms disposed on the servicing platform rearwardly and downwardly;
      opening two capture forks, each attached to a distal end of the respective telescopic arm;
      engaging selected sections of the UAV using the capture forks upon confirmation that the UAV is within the capture envelope; and
      retracting the two telescopic arms to draw and position the captured UAV on the servicing platform.

14. The method as claimed in claim 13, wherein the flying and capturing steps are performed at least partly autonomously.

15. The method as claimed in claim 13, wherein the extending, flying and capturing steps are performed manually.

16. The method as claimed in claim 13, further comprising adjusting at least one of flight controls and a centre of gravity of the servicing aircraft while the captured UAV is positioned on the servicing platform.

17. A method for servicing a UAV in mid-flight, the method comprising the steps of:
   flying a servicing aircraft;
   capturing the UAV using the method for aerial recovery of a UAV in mid-flight as claimed in claim 13; and
   servicing the captured UAV.

18. The method as claimed in claim 17, wherein servicing the UAV comprises at least one of refueling the UAV, rearming the UAV, and performing maintenance or replacement of a line replaceable unit.

* * * * *